US012002257B2

United States Patent
Kandpal et al.

(10) Patent No.: US 12,002,257 B2
(45) Date of Patent: Jun. 4, 2024

(54) VIDEO SCREENING USING A MACHINE LEARNING VIDEO SCREENING MODEL TRAINED USING SELF-SUPERVISED TRAINING

(71) Applicant: GOOGLE LLC, Mountain View, CA (US)

(72) Inventors: Mayank Kandpal, Zurich (CH); Bakhodir Ashirmatov, Zurich (CH); Filip Pavetic, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 369 days.

(21) Appl. No.: 17/536,509

(22) Filed: Nov. 29, 2021

(65) Prior Publication Data
US 2023/0169759 A1    Jun. 1, 2023

(51) Int. Cl.
*G06V 10/774*    (2022.01)
*G06N 20/00*    (2019.01)
(Continued)

(52) U.S. Cl.
CPC ......... *G06V 10/7747* (2022.01); *G06N 20/00* (2019.01); *G06V 10/761* (2022.01); *G06V 10/776* (2022.01); *G06V 20/46* (2022.01)

(58) Field of Classification Search
CPC ............. G06V 10/7747; G06V 10/761; G06V 10/776; G06V 20/46; G06V 10/774; G06V 10/82; G06V 20/40; G06N 20/00
See application file for complete search history.

(56) References Cited

U.S. PATENT DOCUMENTS

| 8,457,346 | B2 | 6/2013 | Rodriguez et al. |
| 11,748,988 | B1 * | 9/2023 | Chen ........................ G06F 16/78 386/241 |

(Continued)

OTHER PUBLICATIONS

Xu et al., "Rethinking Self-Supervised Correspondence Learning: A Video Frame-level Similarity Perspective", Mar. 31, 2021 ( Year: 2021).*

(Continued)

*Primary Examiner* — Aaron W Carter
(74) *Attorney, Agent, or Firm* — Young Basile Hanlon & MacFarlane, P.C.

(57) ABSTRACT

Video content screening using a trained video screening model trained using self-supervised training includes automatically generating a training dataset by obtaining predicate screening data indicating a predicate temporal segment within a training video and a corresponding reference temporal segment within the reference video, obtaining candidate screening data for an extended temporal segment from the training video, wherein the extended temporal segment includes the predicate temporal segment and at least one frame from the training video adjacent to the predicate temporal segment, wherein the candidate screening data indicates a similarity between a screening frame from the reference video and a spatial portion of a candidate frame from the extended temporal segment, and, in response to a determination that a determined similarity between the candidate subframe including, in the automatically generated training dataset, training example data indicating the similarity between the candidate subframe and the screening frame.

20 Claims, 11 Drawing Sheets

(51) Int. Cl.
  *G06V 10/74* (2022.01)
  *G06V 10/776* (2022.01)
  *G06V 20/40* (2022.01)

(56) References Cited

U.S. PATENT DOCUMENTS

| | | | |
|---|---|---|---|
| 2008/0112630 A1 | 5/2008 | Nestares et al. | |
| 2009/0263014 A1 | 10/2009 | Zhang et al. | |
| 2009/0324199 A1 | 12/2009 | Haitsma et al. | |
| 2009/0327334 A1 | 12/2009 | Rodriguez et al. | |
| 2010/0061590 A1 | 3/2010 | Neogi | |
| 2010/0211794 A1 | 8/2010 | Bilobrov | |
| 2016/0267079 A1 | 9/2016 | Ramanathan et al. | |
| 2018/0053057 A1* | 2/2018 | De Souza | G06V 20/41 |
| 2018/0204065 A1* | 7/2018 | Pavetic | G06F 18/241 |
| 2020/0035234 A1* | 1/2020 | Aarabi | G06N 3/088 |
| 2020/0210768 A1* | 7/2020 | Turkelson | G06V 40/63 |
| 2022/0101104 A1* | 3/2022 | Chai | G06T 11/00 |
| 2022/0296116 A1* | 9/2022 | Gideon | G16H 50/50 |
| 2022/0309289 A1* | 9/2022 | Kawaski | G06F 18/2148 |
| 2022/0374470 A1* | 11/2022 | Kontkanen | G06F 16/739 |
| 2023/0072445 A1* | 3/2023 | Liang | G06N 3/04 |
| 2023/0113643 A1* | 4/2023 | Mittal | G06V 10/7753 382/159 |
| 2023/0169759 A1* | 6/2023 | Kandpal | G06V 10/761 382/159 |
| 2023/0274548 A1* | 8/2023 | Dwibedi | G06F 18/24147 382/181 |
| 2023/0306258 A1* | 9/2023 | Assael | G06N 3/045 |
| 2023/0368503 A1* | 11/2023 | Salamon | G06V 10/761 |
| 2023/0409582 A1* | 12/2023 | Kandpal | G06F 16/24578 |

OTHER PUBLICATIONS

Hu et al., "Learning spatial-temporal features for video copy detection by the combination of CNN and RNN", May 22, 2018 (Year: 2018).*

Kordopatis-Zilos et al., "Self-Supervised Video Similarity Learning", Jun. 16, 2023 (Year: 2023).*

Qian Rui et al: "Spatiotemporal Contrastive Video Representation Learning", 2021 IEEE/CVF Conference on Computer Vision and Pattern Recognition (CVPR), IEEE, Jun. 20, 2021, pp. 6960-6970.

International Search Report and Written Opinion of International Application No. PCT/US2022/041214 dated Nov. 28, 2022; 14 pages.

International Search Report and Written Opinion in PCT/US2017/050404, dated Nov. 20, 2017.

* cited by examiner

VIDEO SCREENING USING A MACHINE LEARNING VIDEO SCREENING MODEL TRAINED USING SELF-SUPERVISED TRAINING

BACKGROUND

Digital images and video can be hosted, or stored, such on a server or content storage and distribution system, such as using electronic communication via an electronic communication network, such as the Internet. Client devices, which may be operated by users, may upload images and videos to content storage and distribution systems, and may access images and videos stored by content storage and distribution systems.

SUMMARY

Disclosed herein are aspects of systems, methods, and apparatuses for video screening using a machine learning video screening model trained using self-supervised training.

An aspect is a method for video screening using a machine learning video screening model trained using self-supervised training. Video screening using a machine learning video screening model trained using self-supervised training may include screening a current video in response to automatically identified screening data obtained from a trained video screening model trained using self-supervised training, wherein the screening data indicates a similarity between the current video and a reference video. Self-supervised training includes obtaining the trained video screening model by training an untrained video screening model using a training dataset automatically generated by obtaining automatically generated predicate screening data indicating a predicate temporal segment within a training video and a corresponding reference temporal segment within the reference video, obtaining candidate screening data for an extended temporal segment from the training video, wherein the extended temporal segment includes the predicate temporal segment and at least one frame from the training video adjacent to the predicate temporal segment, wherein the candidate screening data indicates a similarity between a screening frame from the reference video and a candidate subframe, wherein the candidate subframe is a spatial portion of a candidate frame from the extended temporal segment, and in response to a determination that a determined similarity between the candidate subframe and the screening frame is greater than or equal to a defined similarity threshold, including, in the automatically generated training dataset, training example data indicating the similarity between the candidate subframe and the screening frame.

Another aspect is a method for video screening using a machine learning video screening model trained using self-supervised training. Video screening using a machine learning video screening model trained using self-supervised training may include obtaining an input video, obtaining, from a trained video screening model trained using self-supervised training, screening data indicating an automatically identified association between the input video and a reference video, and, in response to obtaining the screening data, identifying the input video as a screened video. The self-supervised training includes obtaining an automatically generated training dataset. Obtaining the automatically generated training dataset includes obtaining a training video, obtaining the reference video, obtaining predicate screening data generated using a first previously trained video screening model with respect to the training video and the reference video, wherein the predicate screening data indicates a predicate temporal segment within the training video and a corresponding reference temporal segment within the reference video, and obtaining, from a second previously trained video screening model, candidate screening data for an extended temporal segment from the training video, wherein the extended temporal segment includes the predicate temporal segment and at least one of a frame from the training video preceding the predicate temporal segment or a frame from the training video subsequent to the predicate temporal segment, wherein the candidate screening data indicates an association between a screening frame from the reference video and a candidate subframe, wherein the candidate subframe is a spatial portion of a candidate frame from the extended temporal segment. Obtaining the automatically generated training dataset includes, in response to a determination that a determined similarity value with respect to the candidate subframe and the screening frame is greater than or equal to a first defined similarity threshold, and in response to a determination that data indicating the association between the candidate subframe and the screening frame is absent from filtering screening data obtained from the first previously trained video screening model with respect to the training video and the reference video, and in response to a determination that a similarity value with respect to the screening frame and a spatial portion of the screening frame is less than a second defined similarity threshold, including, in the automatically generated training dataset, training example data indicating the association between the candidate subframe and the screening frame. The self-supervised training includes debiasing the automatically generated training dataset, obtaining an untrained video screening model, and obtaining the trained video screening model by training the untrained video screening model using the automatically generated training dataset.

Another aspect is a system for video screening using a machine learning video screening model trained using self-supervised training. The system may include a non-transitory computer-readable storage medium storing instructions for self-supervised training, and a processor configured to execute the instructions stored in the non-transitory computer-readable storage medium to obtain a trained video screening model, wherein, to obtain the trained video screen model, the processor executes the instructions to train an untrained video screening model using a training dataset. To automatically generate the training dataset the processor executes the instructions to obtain automatically generated predicate screening data indicating a predicate temporal segment within a training video and a corresponding reference temporal segment within the reference video, obtain candidate screening data for an extended temporal segment from the training video, wherein the extended temporal segment includes the predicate temporal segment and at least one frame from the training video adjacent to the predicate temporal segment, wherein the candidate screening data indicates a similarity between a screening frame from the reference video and a candidate subframe, wherein the candidate subframe is a spatial portion of a candidate frame from the extended temporal segment, and, in response to a determination that a determined similarity between the candidate subframe and the screening frame is greater than or equal to a defined similarity threshold, include, in the automatically generated training dataset, training example data indicating the similarity between the candidate subframe and the screening frame.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Figure 1:
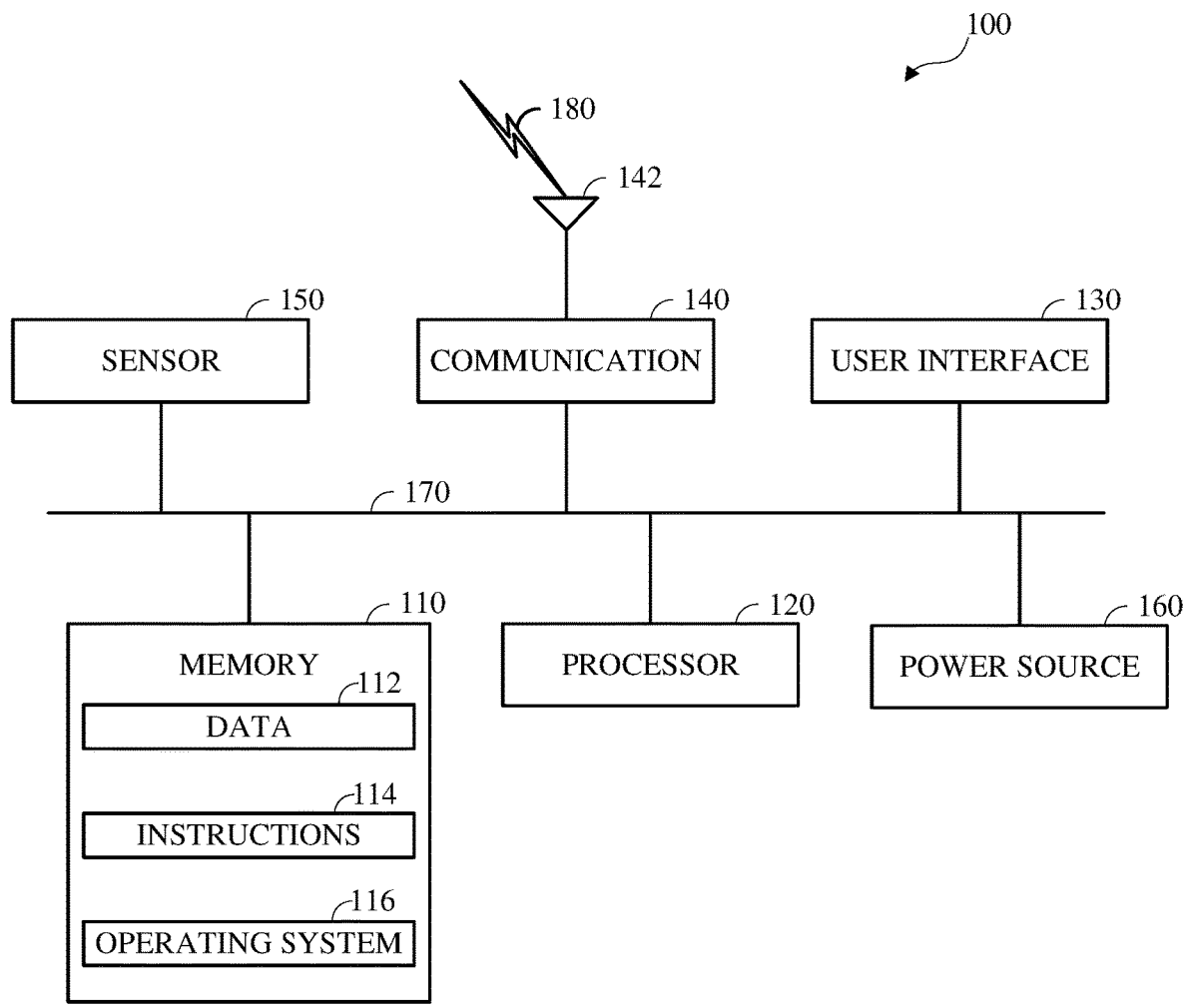
FIG. 1 is a diagram of a computing device.

A server or content storage and distribution system may host thousands, millions, or billions of videos uploaded, or otherwise provided, to the server or content storage and distribution system. The server or content storage and distribution system may include, or may access, a repository, database, data store, or other collection, of videos defined or described as restricted, protected, or controlled access videos that include content associated with copyright protection, or other content for which access restrictions are defined. The server or content storage and distribution system may restrict, limit, or otherwise control, access to the videos defined or described as restricted, protected, or controlled access videos. The server or content storage and distribution system may screen the uploaded videos to detect restricted content included in the uploaded videos. For example, the server or content storage and distribution system may generate fingerprint data representing a respective restricted access video, the server or content storage and distribution system may generate fingerprint data representing a respective uploaded video, and, in response to determining that the fingerprint data representing a respective uploaded video Some of the videos uploaded to, or hosted by, the server or content storage and distribution system may include one or more portions of the restricted, protected, or controlled-access, content. For example, a video uploaded to the server or content storage and distribution system may include a controlled access video, or a portion thereof, embedded, or otherwise included, in a spatial portion of the uploaded video and may include other content in other spatial portions of the uploaded video. In some content storage and distribution systems, inclusion of restricted access content in another video, such as an uploaded video, may circumvent, or reduce the accuracy, efficiency, or both, of controlling access to the restricted access content.

The content storage and distribution system described herein may screen the uploaded, or hosted, videos using a trained machine learning video screening model, which may detect and flag the uploaded, or hosted, videos that embed controlled access content. The accuracy, efficiency, or both, of video screening using a trained machine learning video screening model may correlate with the size and quality of the training data used to train the machine learning video screening model. The video screening using a machine learning video screening model trained using self-supervised training described herein improves on the training used for other models by automatically generating training data. For example, the cardinality, or number of training examples, of an automatically generated training dataset may be substantially greater than a manually generated training dataset. The automatic, or self-supervised, generation of training data is based on a previously trained machine learning video screening model. To further improve video screening using a machine learning video screening model trained using self-supervised training, the screening data generated by the previously trained machine learning video screening model is expanded temporally, and further processed, as described herein, so that training examples that are false negatives with respect to the previously trained machine learning video screening model are included as training examples.

FIG. 1 is a block diagram of an example of a computing device 100. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown as a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 may be, or may include, input data, encoded data, decoded data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program or application, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
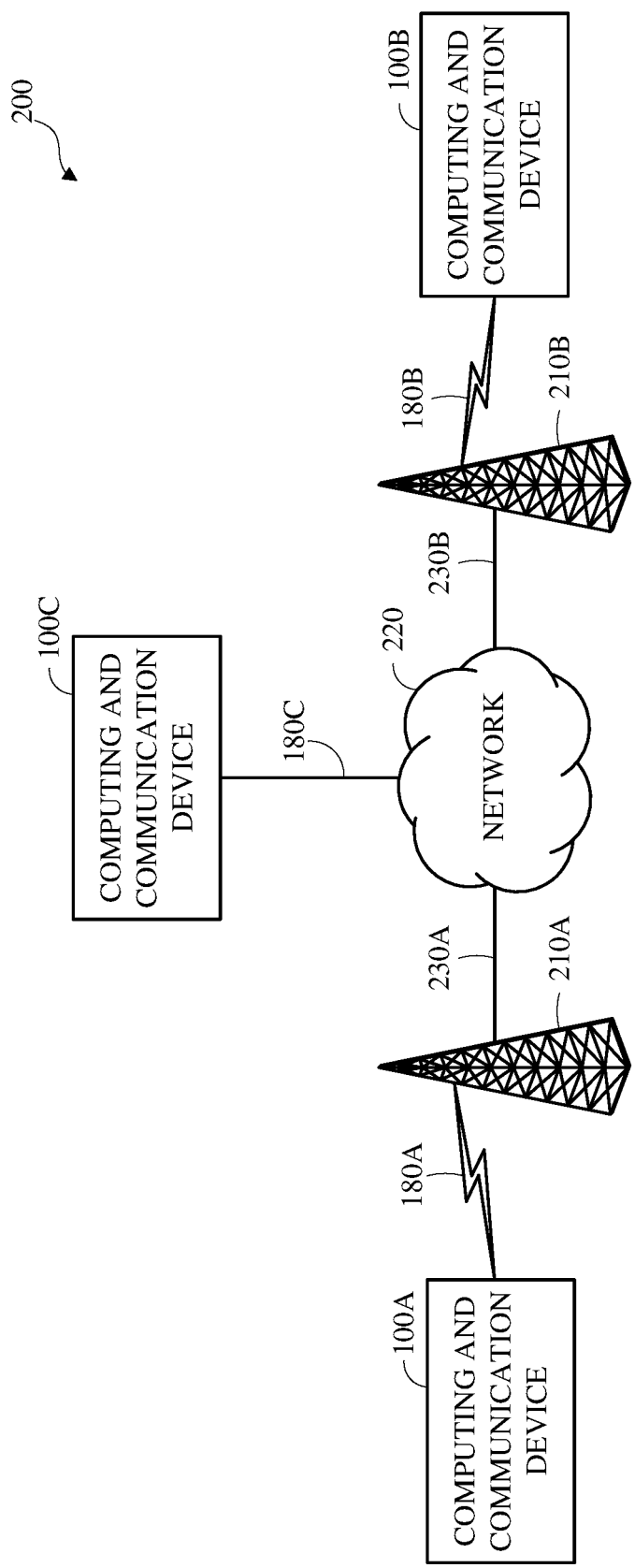
FIG. 2 is a diagram of a computing and communications system.

FIG. 2 is a diagram of a computing and communications system 200. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, process, such as encode, process, store, transmit, or a combination thereof data, such as audio data or video data, and one or both of the computing and communication device 100A and the computing and communication device 100B may receive, process, such as decode, process, store, present, or a combination thereof the data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store data, such as encoded data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
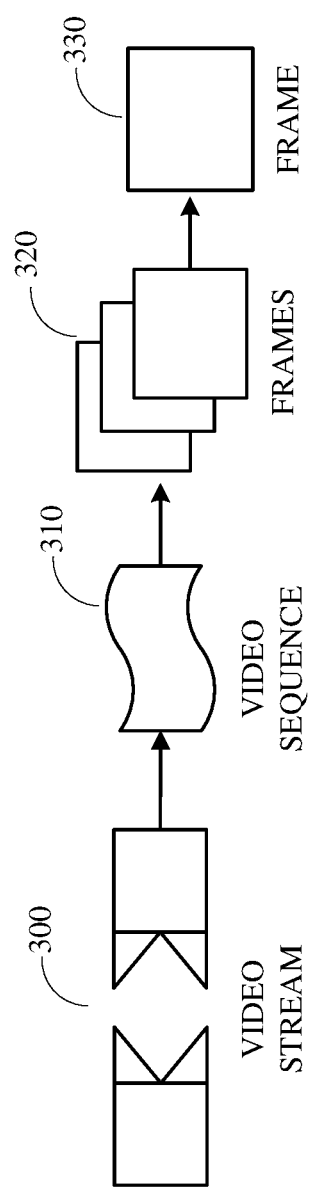
FIG. 3 is a diagram of a video stream.

FIG. 3 is a diagram of a video stream 300. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

A respective frame 330 from the adjacent frames 320 may represent a single image from the video stream. Although not shown in FIG. 3, a frame 330 may include one or more segments, tiles, or planes, which may be coded, or otherwise processed, independently, such as in parallel. Although not shown in FIG. 3, a frame can include pixels. A frame, a portion of a frame, such as a block, a pixel, or a combination thereof can include display information, such as luminance information, chrominance information, or any other information that can be used to store, modify, communicate, or display the video stream or a portion thereof.

Figure 4:
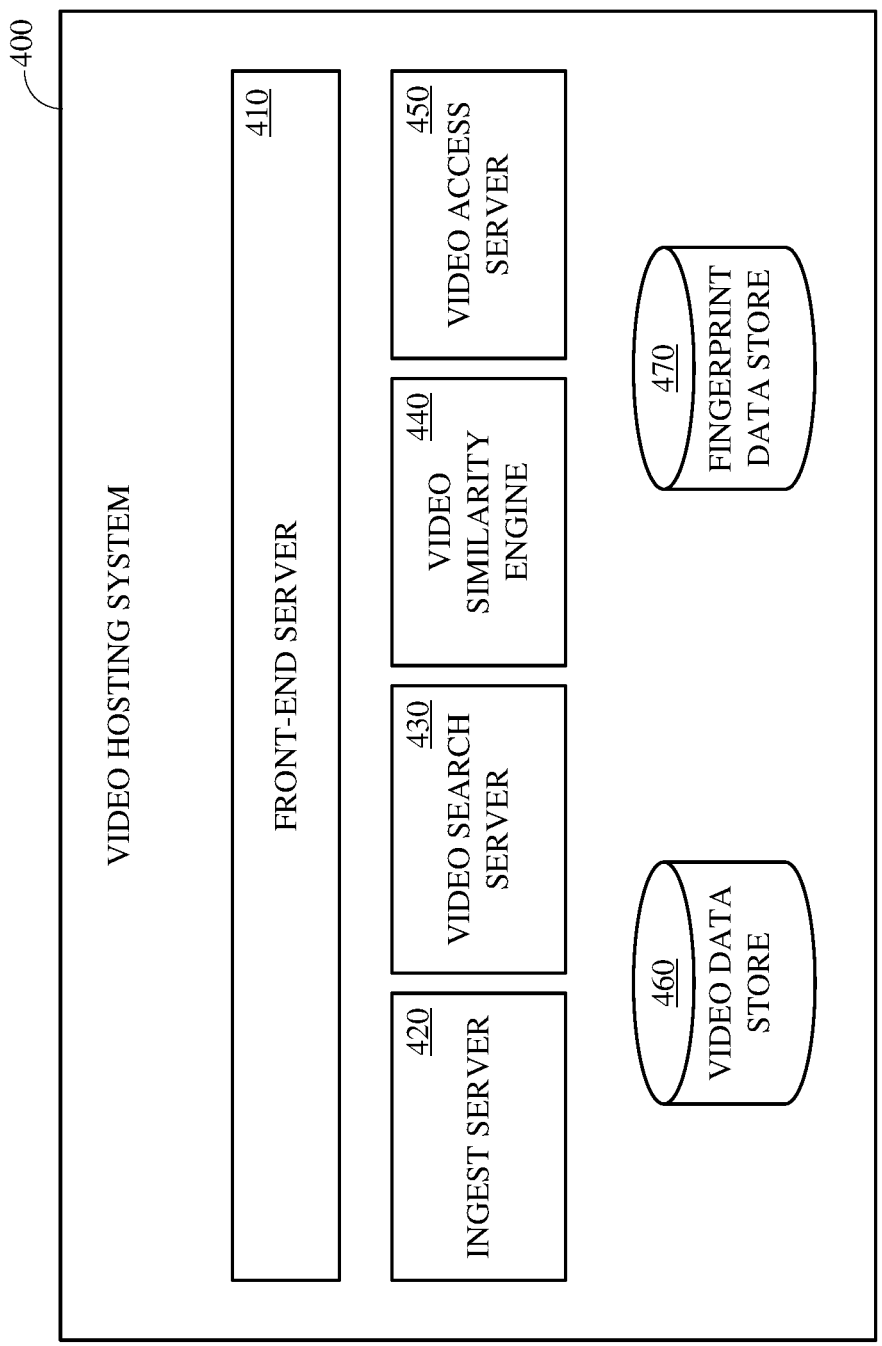
FIG. 4 is a block diagram of a video hosting system.

FIG. 4 is a block diagram of a video hosting system 400. The video hosting system 400 may be, or may include, a computing device, such as the computing device 100 shown in FIG. 1, or a computing and communication device, such as one or more of the computing and communication devices 100A, 100B, 100C shown in FIG. 2. As shown in FIG. 4, video hosting system 400 includes a front-end server 410, an ingest server 420, a video search server 440, a video similarity engine 440, a video access server 450, a video data store 460, and a fingerprint data store 470. In some embodiments, the video hosting system 400 may include other components not shown in FIG. 4, such as firewalls, load balancers, application servers, failover servers, and site management tools. In some embodiments, one or more of the front-end server 410, the ingest server 420, the video search server 440, the video similarity engine 440, the video access server 450, the video data store 460, or the fingerprint data store 470, may be omitted, or absent, from the video hosting system 400.

One or more computing device, such as the computing device 100 shown in FIG. 1, or a computing and communication device, such as one or more of the computing and communication devices 100A, 100B, 100C shown in FIG. 2, may access the video hosting system 400 to obtain, review, or both, video content. For example, the video hosting system 400 may implement a video search interface, a video browsing interface, or both, which may be user interfaces, programmatic interfaces, or both. The video hosting system 400 may obtain videos, video content, or video files, such as from uploads of videos, searches or crawls of other websites or databases of videos, or the like, or any combination thereof. The video hosting system 400 can be configured to allow for uploads of content (e.g., user-generated content (UGC)). The video hosting system 400 can be configured to obtain videos from other sources by crawling such sources or searching such sources in real time.

The video hosting system 400 may be, or may be available at, a website. As used herein, the term "website" can represent a computing device, such as the computing device 100 shown in FIG. 1, a computing and communication device, such as one or more of the computing and communication devices 100A, 100B, 100C shown in FIG. 2, or a computing system including one or more computing devices, adapted to serve content using one or more electronic communication protocols, which may include, but is not limited to, content uploaded or downloaded via the Internet using the HTTP protocol.

The front-end server 410 can communicate with other computing devices, such as user or client devices, using an electronic communication protocol via an electronic communication link, such as the wired or wireless electronic communication medium 180 shown in FIG. 1, or one or more of the wired or wireless communication links 180A, 180B, 180C shown in FIG. 2, which may include communicating via a network, such as the network 220 shown in FIG. 2, which may include the Internet.

The front-end server 410 can receive requests from external (with respect to the video hosting system 400) computing devices, such as user devices. For simplicity, external computing devices communicating with the video hosting system 400 are referred to herein as client devices. The front-end server 410 can communicate with the other components of the video hosting system 400, such as to process requests.

The front-end server 410 can monitor interactions of client devices with the video hosting system 400. For example, a client device may access a web page, upload a video, view a video, make a purchase, or fill a web-based form, and the front-end server 410 can monitor these interactions. The front-end server 410 may transmit the requested video and related video links to the client device for presentation, such as on a webpage. The requested video can be streamed by the front-end server 410 to the client device. One or more related video links may be presented on the webpage where the requested video is playing, such that the related video link can be selected to view the related videos.

Content received by the video hosting system 400, such as from a client device for posting to the video hosting system 400 is sent, or otherwise made available, to the ingest server 420 for processing. The processing of the video file includes assigning an identifier to the received video file. Other aspects of processing the video file may include formatting, transcoding, compressing, metadata tagging, content analysis, or other video data processing techniques, or combinations thereof.

In an embodiment, the client device transmits metadata, such data as input in a user interface form, in conjunction with uploading the video file to the video hosting system 400. The transmitted metadata may include data that describes the video, such as a title, a description, tag data, or combinations thereof. The transmitted metadata may include an indication of a media type for the content, such as the 'video' type. The ingest server 420 stores the processed video file in the video data store 460. The ingest server 420 stores the metadata of the video file.

The video data store 460 stores video files, such as video files transmitted to the video hosting system 400. Storing a video file may include storing one or more icons or thumbnail views. Storing a video file may include storing associated metadata, such as a title, an author, tags, a description, comments, a rating, or combinations thereof. In some embodiments, the ingest server 420 may send, or otherwise make available, received videos to the video similarity engine 440 for analysis.

The video search server 430 can process requests received by the front-end server 410 and can identify videos that are relevant to the requests. A request provided, which may be responsive to input, such as user input, via the client device to the front-end server 410 may include a search query specifying one or more search terms. The video search server 430 may use the search terms to query the metadata of video files stored in the video data store 460. The search results can include videos, for which the associated metadata is relevant to at least one or more of the search terms. The search results, or a subset thereof, may be transmitted to the front-end server 410. The front-end server 410 may transmit the search results, or a subset thereof, to the client device for presentation to a user.

The video access server 450 receives from the front-end server 410 requests, such as from respective client devices, for indicated videos. A request for a video may be received from a user device in accordance with browsing videos, such as via respective categories of the video hosting system 400 or in response to receiving input, such as user input clicking on a link to a video from a search results webpage. The request transmitted by the client device can include the identifier of a video. The video access server 450 can use the identifier to locate the video in the video data store 460. The video access server 450 can provide the video requested to the front-end server 410. The front-end server 410 transmits, or otherwise makes available, such as via streaming, the video to the client device.

The video similarity engine 440 can determine if a video, such as an uploaded video, includes video content of one or more other videos, such as other videos that are copyright protected, access restricted, or the like (protected videos). In response to determining that an uploaded video is similar, such as within defined similarity thresholds, to a protected video, the video similarity engine 440 may flag, such as unauthorized, or remove the video from the video hosting system 400. The video similarity engine 440 can process a video substantially concurrently with the video being uploaded to the video hosting system 400. The video similarity engine 440 can process a video substantially concurrently with the ingest server 420 processing the video.

To determine similarity, the video similarity engine 440 may create one or more fingerprints, one or more sub-fingerprints, or a combination thereof, for a video. In an example, sub-fingerprints can be generated using video content that includes motion. Sub-fingerprints represent respective portions of the video content included in a video. Sub-fingerprints can be used to determine whether a video includes video content that is copied, or partially copied, from another video. The video similarity engine 440 can compare sub-fingerprints to fingerprints stored in the fingerprint data store 470.

In response to determining that a sub-fingerprint of a video sufficiently matches a fingerprint stored in the fingerprint data store 470 that is derived from another video, the video similarity engine 440 determines that the video includes video content copied from another video. Videos stored in the video hosting system 400 identified as including content copied from another video may be removed from the video hosting system 400. In response to determining that a video being uploaded to the video hosting system 400 includes content copied from another video, the upload of the video may be terminated.

The fingerprint data store 470 stores fingerprints derived from a video corresponding to a video file stored in the video data store 460. Fingerprints stored in the fingerprint data store 470 can be used as reference data for the video similarity engine 440 to determine whether a video includes video content of one or more other videos.

Figure 5:
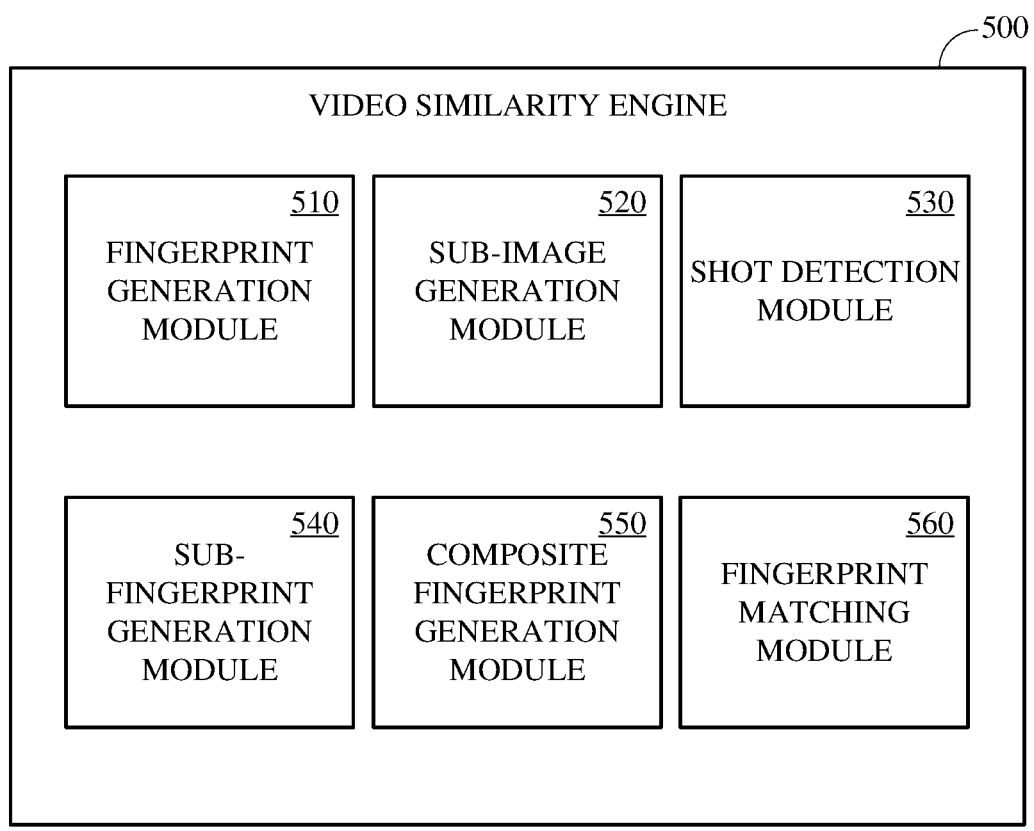
FIG. 5 is a block diagram of an example of a video similarity engine.

FIG. 5 is a block diagram of an example of a video similarity engine 500. The video similarity engine 500 is similar to the video similarity engine 440 shown in FIG. 4, except as is described herein or as is otherwise clear from context. The video similarity engine 500 may be included in video hosting systems, such as the video hosting system 400 shown in FIG. 4.

As shown in FIG. 2, the video similarity engine 500 includes a fingerprint generation module 510, a sub-image generation module 520, a shot detection module 530, a sub-fingerprint generation module 540, a composite fingerprint generation module 550, and a fingerprint matching module 560. The video similarity engine 500 may include other components not shown in FIG. 5. In some embodiments, one or more of the fingerprint generation module 510, the shot detection module 530, the composite fingerprint generation module 550, the sub-fingerprint generation module 540, the fingerprint matching module 560, and the sub-image generation module 520, may be combined. In some embodiments, although shown as a unit in FIG. 4, the video similarity engine 500 may be implemented as two or more distinct units.

The fingerprint generation module 510 generates one or more fingerprints for an image, a sequence of images, or a video. The fingerprint generation module 510 generates fingerprints for time intervals of a video using video frames of the video. A fingerprint can be generated based on a video frame or an uninterrupted sequence of video frames that have continuity of image content.

A fingerprint may be expressed as a bit vector representing the spatial characteristics of a video frame, the temporal characteristics of a video frame, the structural characteristics of a video frame, or a combination thereof. A fingerprint is an identifier of a video frame that is based on the content of the video frame, such that minor variations due to compression, de-compression, noise, frame rate, start and stop time, resolution, and the like, do not significantly affect the fingerprint.

The fingerprint generation module 510 may receive a video, or one or more frames thereof, from a component of the video hosting system, such as the front-end server 410 shown in FIG. 4, the ingest server 420 shown in FIG. 4, the video data store 460 shown in FIG. 4. In some embodiments, the fingerprint generation module 510 generates fingerprints for a video concurrently, or substantially concurrently, with processing of the video by the ingest server.

The sub-image generation module 520 generates sub-images using video frames of a video. For simplicity and clarity, the video from which one or more sub-images may be generated is referred to herein as the input video and the frames of the input video are referred to herein as input frames. The sub-images are used to generate sub-fingerprints that are used to detect whether the input video includes unauthorized content. A sub-image is a portion, or region, of an input frame, such as a rectangular region, that includes motion, relative to one or more other frames of the video, wherein another portion of the input frame, such a portion surrounding or adjacent to the rectangular region, is static, or semi-static. Video content that includes motion in a sub-image has a relatively high probability of including unauthorized content. The sub-image generation module 520 identifies video content that includes motion and corresponding regions of respective input video frames. The sub-image generation module 520 extracts, copies, or identifies, the image content, such as pixel values, of the identified sub-image regions from respective input frames to generate the sub-images.

In some embodiments, an input frame or input video may include static, or semi-static, content (disguising content) spatially proximate to a rectangular sub-image region, such as adjacent to the rectangular region or partially overlapping the rectangular region, such as along a border or edge of the rectangular region, and corresponding sub-images may include the content of the rectangular region and omit or exclude the static, or semi-static content. For example, the disguising content may appear as a visual frame or border around the rectangular sub-image region.

In an example, an input video may include a first portion and a second portion wherein the first portion is a rectangular sub-image region that includes, or may include, unauthorized content, and the second portion includes static, or semi-static, content, with respect to the input frames of the video, such as background content. For the respective input frames of the video, the sub-image generation module 520 may generate a respective sub-image that includes the rectangular sub-image region of the respective input frame that may include unauthorized content.

In some embodiments, an input video may include unauthorized, or potentially unauthorized, content from two or more other videos, and the sub-image generation module 520 may generate respective separate sub-images corresponding to the respective other videos. For example, an input video may include a first rectangular sub-image portion corresponding to a first unauthorized video, a second rectangular sub-image portion corresponding to a second unauthorized video, and a third portion, which may include static, or semi-static, content; and, with respect to an input frame, the sub-image generation module 520 may generate a first sub-image corresponding to a frame of the first unauthorized video, and a second sub-image corresponding to a frame of the second unauthorized video. Multiple, non-overlapping, sub-images may be generated from an input frame. Sub-images retain the temporal characteristics of the corresponding input frames from which they are generated.

To identify the sub-images, the sub-image generation module 520 tracks motion of video content, such as across multiple input frames. The sub-image generation module 520 performs a motion analysis to determine the relative motion between frames. The motion analysis may include comparing the pixels, such as color values, of a first video frame to the spatially corresponding pixels of the subsequent video frame. Pixels for which the inter-frame difference equals or exceeds a defined motion threshold are identified as having motion (motion pixels). Pixels for which the inter-frame difference is less than the defined threshold are identified as still or static pixels. In some implementations, the motion threshold can be evaluated across multiple consecutive frames corresponding to a defined temporal window.

The sub-image generation module 520 generates a binary image, or motion-pixel map, for respective frames, where the pixels, or pixel locations, of the motion-pixel map have a value of one (1) for motion pixels and a value of zero (0) for the still pixels.

For example, for an input video including a region including unauthorized content and otherwise, such as outside the region, including static or semi-static content, the corresponding motion-pixel map will be a substantially rectangular area wherein the respective pixels, or pixel locations, or a substantial majority thereof, are motion pixels, and other pixels, or pixel locations, outside the rectangular area, are static pixels.

The sub-image generation module 520 uses the rectangular area wherein the respective pixels, or pixel locations, or a substantial majority thereof, are motion pixels to identify the regions to extract as sub-images. The sub-image generation module 520 may form a region by fitting a rectangle around the identified motion pixels such that the rectangle encompasses the identified motion pixels. In some implementations, one or more still pixels spatially proximate to the motion pixels may be included in a rectangular sub-image region. In some embodiments, a rotating calipers algorithm may be used to determine a minimum area rectangle for a sub-image region that maximizes the number, or cardinality, or percentage of motion pixels in the rectangle, minimizes the number, or cardinality, or percentage of static pixels in the region, or both.

In some embodiments, a portion or area of an input frame in which a minority of pixels, or pixel locations, are identified as motion pixels and a majority of pixels, or pixel locations are identified as static pixels, may be identified as including static, or semi-static, content and the sub-image generation module 520 may omit extracting the portion as a sub-image.

For example, the sub-image generation module 520 may determine a ratio of still pixels to motion pixels in a defined portion of an input frame and may compare the determined ratio to a threshold ratio to determine whether to identify the region for extraction as a sub-image. The determined ratio may be equal to or greater than the threshold ratio and the sub-image generation module 520 may identify the area as a region that will be extracted as a sub-image. The determined ratio may be less than the threshold ratio and the sub-image generation module 520 may omit identifying the area as a region that will be extracted as a sub-image. In some embodiments, the sub-image generation module 520 may omit identifying an area having a size, such as a number or cardinality of pixels, that is less than a defined minimum size, as a region that will be extracted as a sub-image.

The sub-image generation module 520 determines a sub-image identifier for a respective sub-image. A sub-image identifier, or a portion thereof, may be assigned to multiple sequential sub-images generated from sequential input video frames and corresponding to regions that are of spatially concurrent, or substantially concurrent, such as with respect to location and size. The location and size of the region used to generate the sub-image can be determined, for example, based on the locations, such as using matrix or Cartesian notation, of the pixels that are on the boundary of the region, such as a top-left pixel and a bottom-right pixel, with respect to the input frame.

The sub-image generation module 520 determines whether a sub-image identifier may be assigned to respective regions of multiple, such as sequential, input frames, such as based on comparing a location and a size of a first region of a first input frame to a second location and a size of a second region of a second input frame. Responsive to determining that the difference in location between the first region of the first input frame and the second region of the second input frame is within, such as less than, a location difference threshold, and determining that the difference in size between the first region of the first input frame and the second region of the second input frame is within, such as less than, a size difference threshold, the sub-image generation module 520 determines the first region of the first input frame and the second region of the second input frame have the same or substantially the same location and size and assigns the sub-image identifier, or a portion thereof, to the sub-image generated from the first input frame and the sub-image generated from the second input frame. In response to determining that the difference in location between the first region of the first input frame and the second region of the second input frame is greater than the location difference threshold, or determining that the difference in size between the first region of the first input frame and the second region of the second input frame is greater than the size difference threshold, the sub-image generation module 520 determines the first region of the first input frame and the second region of the second input frame have the different location or size and assigns the sub-image identifier to the sub-image generated from the first input frame and assigns another, different, sub-image identifier to the sub-image generated from the second input frame.

The sub-image generation module 520 may generate sub-images of an input video concurrently, or substantially concurrently, with processing of the input video by the ingest server.

The shot detection module 530 identifies sequences of consecutive sub-images as shots that may be used to generate sub-fingerprints. The shot detection module 530 analyzes the characteristics of the consecutive sub-images to determine temporal locations of discontinuities in video content of the sub-images. A discontinuity can be an abrupt change, such as from one frame to the next frame in sequential order, which may correspond to a scene change or camera change, or scene transition, such a fade or a dissolve. Discontinuities may be identified based on one or more sub-image features that can be identified from the content of consecutive sub-images. Discontinuities may be identified based on a change in sub-image identifier between sub-images. In some embodiments, the shot detection module 530 may generate shots based on the input video.

The set of sub-image shots are sent, or otherwise made available, to the sub-fingerprint generation module 540 for generation of sub-fingerprints. The generated sub-image shots are used to create a set of sub-fingerprints for respective time intervals of a video. For example, sub-fingerprints may be generated for respective time intervals (T) having a defined temporal length, such as one second, an input video, such as from the beginning (T=0) of the input video. For a temporal span, such as from a first temporal location (nT, wherein n is an integer), to a subsequent second temporal location ((n+1)T) of an input video, the shot detection module 530 determines one or more shots that have a first frame corresponding to a temporal location at or later than the first temporal location (nT) and last frame corresponding to a temporal location at or before the second temporal location ((n+1)T) to generate sub-fingerprints.

A shot for the time interval is available, empty sub-fingerprints for the time intervals may be generated, and the shot detection module 530 may notify the sub-fingerprint generation module 540 thereof.

In another implementation, the shot detection module 530 organizes the generated shots prior to providing the shots to the sub-fingerprint generation module 540. The shot detection module 530 may group the shots by the sub-image ID associated with the sub-images included in the respective shot or shots. One or more shots that have matching sub-image IDs are organized as a group. A sub-fingerprint can be generated using a group of shots that have the respective sub-image ID.

The sub-fingerprint generation module 540 generates sub-fingerprints for temporal intervals of a video using sub-images generated for the video. Sub-fingerprints are generated for respective temporal intervals T of a video from the beginning (T=0) of the video using one or more sub-images, or subframes, shots of sub-images, or groups of shots for the temporal interval. In some implementations, for a temporal interval of a video, a sub-fingerprint is generated using the one or more shots of the video, of which a starting time is at or later than a starting time point of the temporal interval.

A respective shot may be unavailable, and an empty sub-fingerprint may be generated for the temporal interval of the video. A shot can overlap multiple temporal intervals of a video, and a sub-fingerprint generated using one shot for one temporal interval of a video can represent video content of subsequent temporal intervals of the video. An empty sub-fingerprint is generated for video content of those temporal intervals of a video that has been represented.

The composite fingerprint generation module 550 generates a composite fingerprint for respective temporal intervals T of a video from the beginning (T=0) of the video. For a temporal interval T of a video, a composite fingerprint is a data structure that includes, or references, one or more fingerprints generated for the temporal interval T of the video and one or more sub-fingerprints generated for the temporal interval T of the video. A composite fingerprint of a video can represent a portion of the "motion" video content for the time interval T of the video. The composite fingerprint generation module 550 receives fingerprints generated by the fingerprint generation module 510 and sub-fingerprints generated by the sub-fingerprint generation module 540. A sub-fingerprint may be an empty sub-fingerprint.

Fingerprints and sub-fingerprints respectively represent different aspects of the substantive content of a video, and a composite fingerprint represents, in a compressed form, the substantive characteristics of video, from the fingerprint, and characteristics of the sub-images extracted from the video, from the sub-fingerprints. A composite fingerprint can be used to determine for a video that includes video content from another video, such as for a video that embeds content from one or more other videos in order.

The fingerprint matching module 560 receives a composite fingerprint and matches the received composite fingerprint against reference fingerprints from a data store associated with reference videos. The fingerprint matching module 560 matches the fingerprints of the video and sub-fingerprints of sub-images of the video included in a composite fingerprint against the reference fingerprints. A matching result indicates that video under consideration includes video content from one of the reference videos. The fingerprint matching module 560 may perform the matching simultaneously concurrently, or partially concurrently, with the ingest server processing the video.

Figure 6:
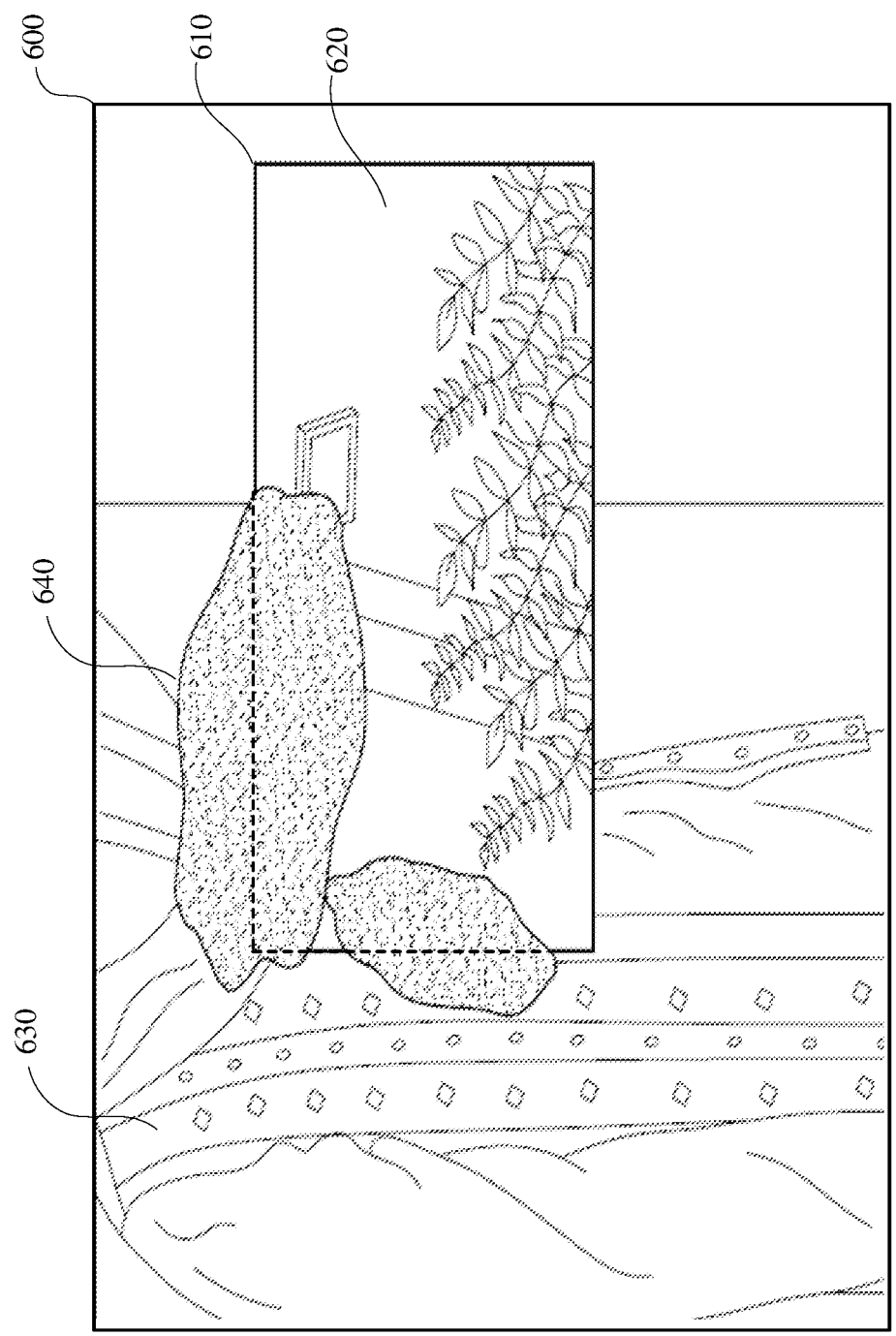
FIG. 6 is a block diagram of an example of a video frame including a spatial subframe that includes restricted content.

FIG. 6 is a block diagram of an example of a video frame 600 including a spatial subframe 610 that includes restricted content 620. The video frame 600 is a frame, or image, such as the frame 330 shown in FIG. 3, of a video, such as the video stream 300 shown in FIG. 3.

The frame 600 may be expressed, represented, encoded, or stored, as a matrix, such as a two-dimensional matrix or Cartesian plane, of pixel values, wherein respective pixel locations in the frame 600 may be indicated using Cartesian coordinates, or other matrix notation. Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

The frame 600 includes the spatial subframe, or subimage, 610, unrestricted content 630, and distractors 640. The spatial subframe 610 is a spatial portion, such as a rectangular portion, of the frame 600. The location of the spatial subframe 610 is a location within the frame 600 as shown or another location within the frame 600. The size, such as the height, such as in pixels, and the width, such as in pixels, of the spatial subframe 610 is larger than a pixel and smaller than the frame 600, such as the size shown or another size. The spatial subframe 610 includes restricted content 620. The distractors 640 may be, or may appear, superimposed over respective portions of the unrestricted content 630, the spatial subframe 610, or both, as shown. Portions of the border of the spatial subframe 610 are shown using broken lines to indicate that the respective portions of the spatial subframe 610 are occluded by the distractors 640. The size, shape, orientation, location, and number, or cardinality, of the distractors 640 may differ from the example shown in FIG. 6. In some implementations, the distractors 640 may be absent, or omitted, from the frame 600. The unrestricted content 630 differs from the restricted content 620. Although one spatial subframe 610 is shown in FIG. 6, a frame may include multiple spatial subframes, which may, respectively, include restricted content. For example, a frame may include a first spatial subframe including first restricted content and a second spatial subframe including second restricted content. Although described herein as rectangular subframes, non-rectangular subframes may be used.

In some implementations, the frame 600 may be a frame from an unscreened video and data expressly identifying the spatial subframe 610, data indicating that the frame 600, or the unscreened video, or a portion thereof, includes restricted content, or both, may be unavailable. In some implementations, the frame 600 may be a frame from a screened video and data expressly identifying the spatial subframe 610, data indicating that the frame 600, or the unscreened video, or a portion thereof, includes restricted content, or both, may be available, such as screening data generated by video screening using a machine learning video screening model trained using self-supervised training, such as the video screening using a machine learning video screening model trained using self-supervised training is shown in FIG. 7.

Figure 7:
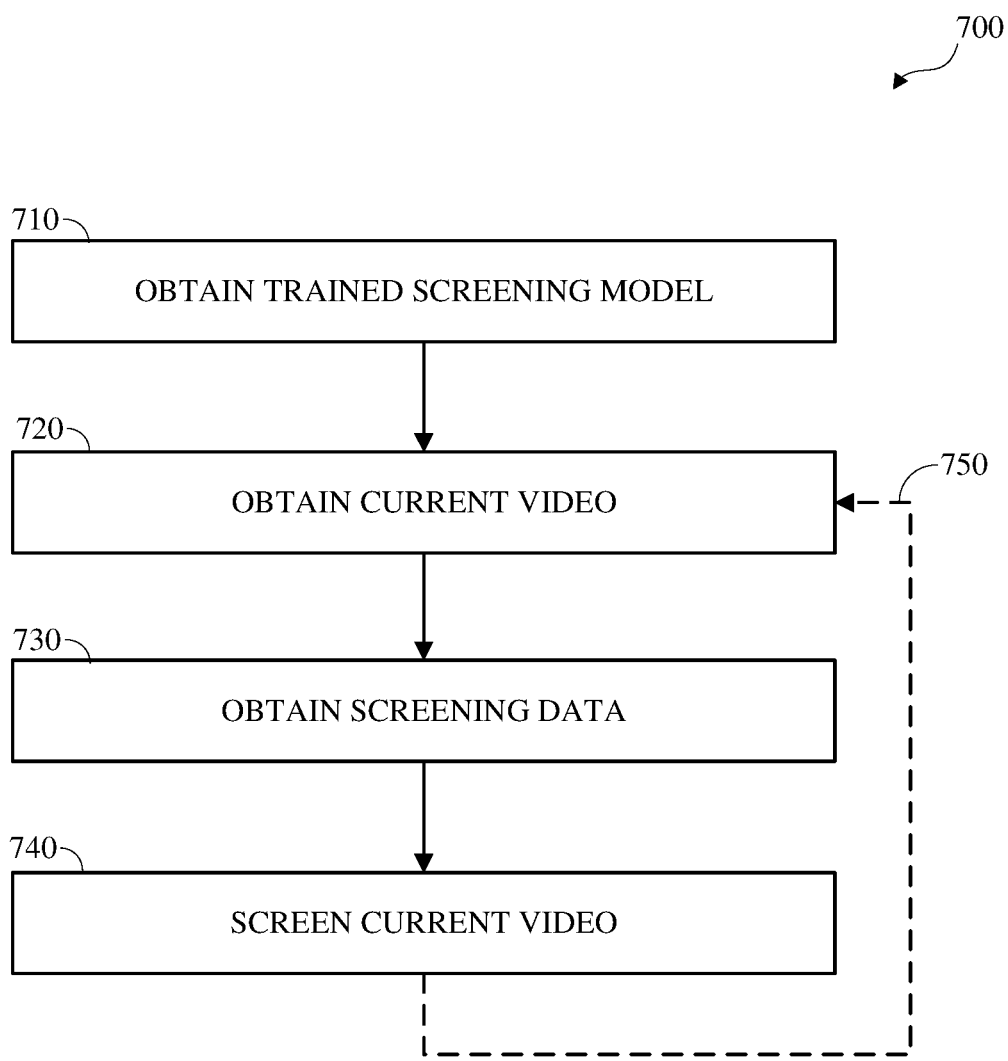
FIG. 7 is a block diagram of an example of a method of video screening using a machine learning video screening model trained using self-supervised training.

FIG. 7 is a block diagram of an example of a method of video screening using a machine learning video screening model trained using self-supervised training 700. Video screening using a machine learning video screening model trained using self-supervised training 700, or a portion or portions thereof, is implemented by a computing device, such as the computing device 100 shown in FIG. 1, one or more of the computing and communication devices 100A, 100B, 100C shown in FIG. 2, a video hosting system, such as the video hosting system 400 shown in FIG. 4, or a component thereof, or a video similarity engine, such as the video similarity engine 500 shown in 5.

Video screening using a machine learning video screening model trained using self-supervised training 700 identifies videos, or a portion or portions thereof, that include restricted content, automatically, using a machine learning video screening model trained using self-supervised training. Video screening using a machine learning video screening model trained using self-supervised training 700 includes obtaining a trained machine learning video screening model trained using self-supervised training at 710, obtaining a current video at 720, obtaining screening data, for the current video, from the trained machine learning video screening model trained using self-supervised training at 730, and screening the current video at 740.

Figure 8:
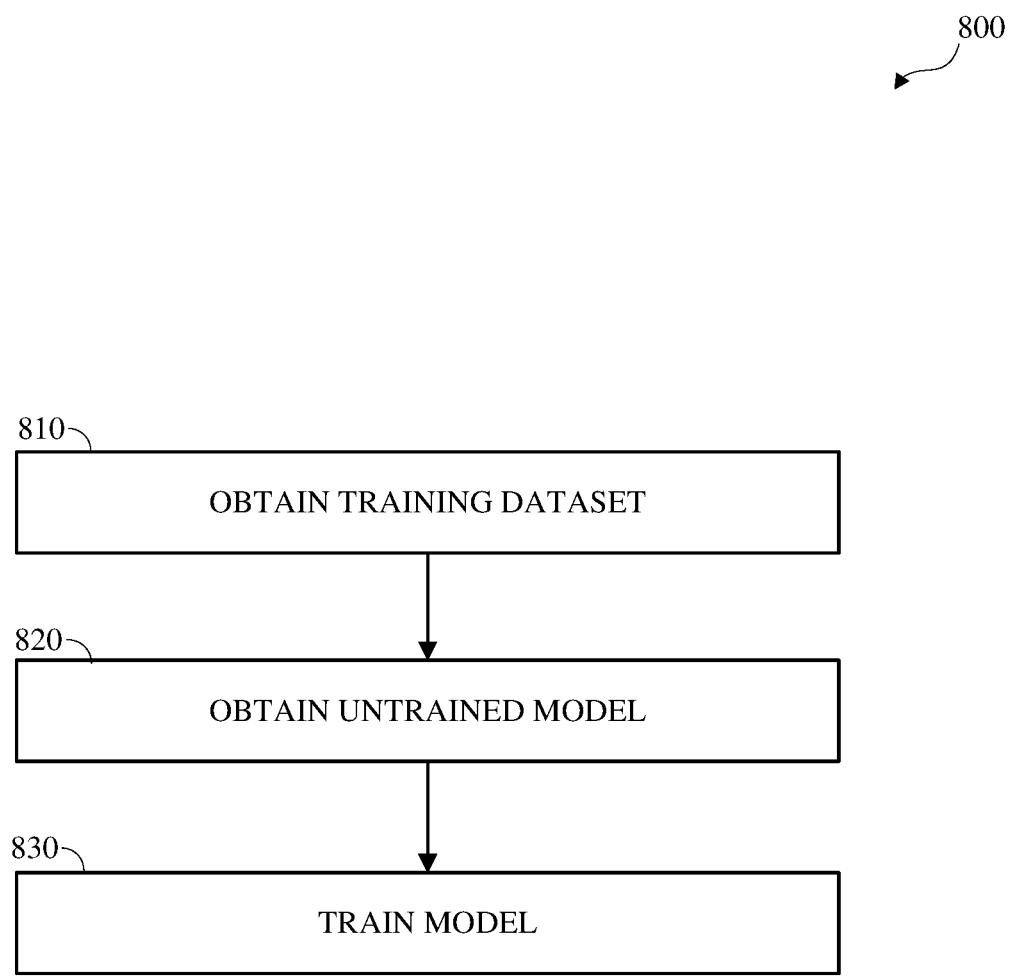
FIG. 8 is a block diagram of an example of a method of obtaining a trained machine learning video screening model trained using self-supervised training.

The trained machine learning video screening model, which may be an object detection model, trained using self-supervised training is obtained at 710. An example of obtaining a trained machine learning video screening model trained using self-supervised training is shown in FIG. 8.

The current video, or input video, is obtained at 720. For example, unscreened videos may be uploaded, or otherwise made available, to the computing device, or a system including the computing device, and the current video may be obtained from the unscreened videos. Although not shown separately in FIG. 7, video screening using a machine learning video screening model trained using self-supervised training 700 may include obtaining the unscreened videos, such as a set of unscreened videos, and obtaining the current video may include identifying an unscreened video from the unscreened videos as the current video. As used herein, the term 'unscreened video' indicates a video designated or identified as unscreened such that screening data for the unscreened video, other than screening data obtained by video screening using a machine learning video screening model trained using self-supervised training 700, is unavailable or unused prior to video screening using a machine learning video screening model trained using self-supervised training 700. The current video includes a sequence of images, or frames, such as the frame 600 shown in FIG. 6.

Screening data is obtained from the trained machine learning video screening model trained using self-supervised training at 730. The screening data includes data identifying or describing a similarity, detected by the trained machine learning video screening model, between the current video and a reference video. The reference video is obtained from a repository, database, data store, or other collection, of videos defined or described as reference videos. For example, a reference video, or protected video, may include content associated with copyright protection, or other content for which access restrictions are defined. The repository of reference videos may include, or may be otherwise associated with, previously generated fingerprint data for the respective reference videos. Although not expressly shown in FIG. 7, a reference video, or reference videos, may be obtained for which previously generated fingerprint data is unavailable, and video screening using a machine learning video screening model trained using self-supervised training 700 may include automatically generating the corresponding fingerprint data.

Obtaining the screening data includes inputting, or otherwise making available, the current video to the trained machine learning video screening model and receiving, or otherwise accessing, the screening data from the trained machine learning video screening model in response to inputting, or otherwise making available, the current video to the trained machine learning video screening model. The screening data obtained at 730 may be similar to predicate screening data obtained as shown at 920 in FIG. 9, except as is described herein or as is otherwise clear from context. For example, the predicate screening data obtained as shown at 920 in FIG. 9 may be obtained using a previously, prior to training the current trained machine learning video screening model using self-supervised training at 710, trained machine learning video screening model, and the screening data obtained at 730 may be obtained using the current trained machine learning video screening model, trained using self-supervised training at 710.

In response to obtaining the screening data at 730, the current video is automatically screened at 740. Screening the current video includes automatically generating, storing, or both, screened video data indicating that the current video is screened, which may include associating, such as by storing, the screened video data, which may include the screening data, or a portion thereof, with the current video. For example, the screening data obtained at 730 may include data identifying or describing a portion, such as a subframe, of the current video, detected by the trained machine learning video screening model obtained at 710, as a candidate similar portion having a similarity with a reference video, or a portion thereof, and automatically generating the screened video data at 740 may include automatically generating fingerprint data for respective frames from the portion of the current video indicated in the screening data. The fingerprint data generated for respective frames from the portion of the current video indicated in the screening data may be automatically compared to the reference video indicated in the screening data, to other reference videos, or to both the reference video indicated in the screening data and the other reference videos, to determine whether the fingerprinted portion, or portions, of the current video is similar, such as having a similarity value greater than a defined similarity threshold, such as 0.9, or ninety percent, to a respective portion of a respective reference video.

In some implementations, screening the current video at 740 may include automatically restricting the current video, such as in response to determining that the fingerprinted portion, or portions, of the current video is similar to a respective portion, or portions, of a respective reference video, or respective reference videos. Restricting the current video may include storing restricted video data indicating that the current video is a restricted video. Restricting the current video may include preventing access to the restricted video. In some implementations, restricting the current video at 730 may be omitted or may be replaced or combined with other processing.

Obtaining a current video at 720, obtaining screening data from the trained machine learning video screening model trained using self-supervised training at 730, and screening the current video at 740 may be performed for other videos, such as other videos from the unscreened videos, as indicated by the broken directional line at 750.

In some implementations, screening data may be unavailable from the trained machine learning video screening model in response to inputting, or otherwise making available, the current video to the trained machine learning video screening model, or the screening data obtained, for the current video, from the trained machine learning video screening model in response to inputting, or otherwise making available, the current video to the trained machine learning video screening model may indicate the absence of an identified similarity, and screening the current video at 740 may be omitted.

Other implementations of video screening using a machine learning video screening model trained using self-supervised training 700 are available. For example, other screening techniques may be used in addition to screening using a machine learning video screening model trained using self-supervised training 700. In some implementations, additional elements of video screening using a machine learning video screening model trained using self-supervised training 700 can be added, certain elements can be combined, and/or certain elements can be removed.

FIG. 8 is a block diagram of an example of a method of obtaining a trained machine learning video screening model trained using self-supervised training 800. Obtaining a trained machine learning video screening model trained using self-supervised training 800, or a portion or portions thereof, is implemented by a computing device, such as the computing device 100 shown in FIG. 1, one or more of the computing and communication devices 100A, 100B, 100C shown in FIG. 2, a video hosting system, such as the video hosting system 400 shown in FIG. 4, or a component thereof, or a video similarity engine, such as the video similarity engine 500 shown in 5. Obtaining a trained machine learning video screening model trained using self-supervised training 800 may be similar to obtaining a trained machine learning video screening model trained using self-supervised training as shown at 710 in FIG. 7, except as is described herein or as is otherwise clear from context.

Obtaining a trained machine learning video screening model trained using self-supervised training 800 includes obtaining a training dataset at 810, obtaining an untrained machine learning video screening model at 820, and training the untrained machine learning video screening model using the training dataset at 830.

Figure 9:
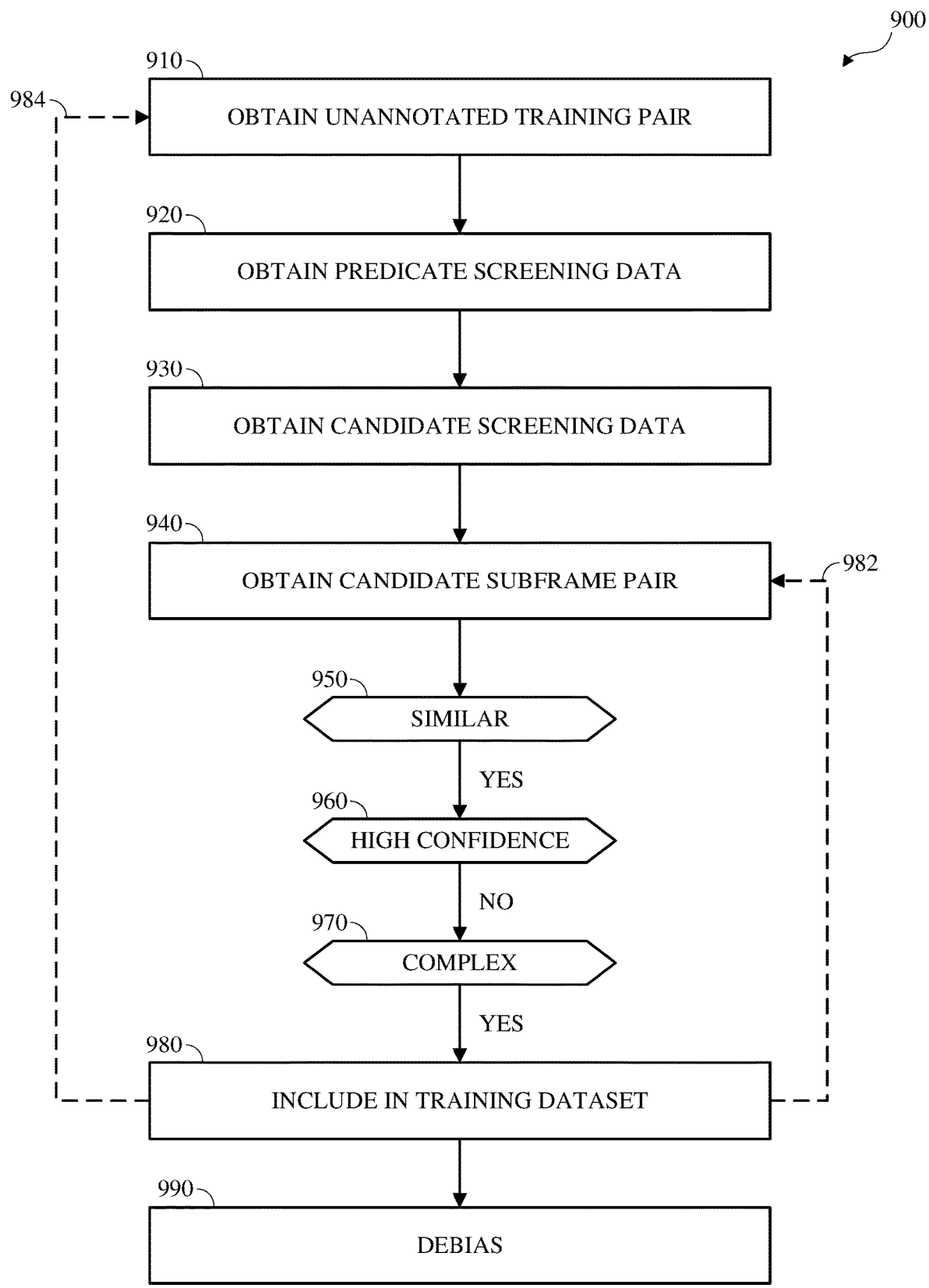
FIG. 9 is a block diagram of an example of a method of obtaining an automatically generated training dataset.

The training dataset, which is an automatically generated training dataset, is obtained at 810. The training dataset includes training examples. The utility, such as accuracy and efficiency, of a trained machine learning model, such as the trained machine learning video screening model described herein, correlates to the number, or cardinality, of training examples in the training dataset used to train the model, and the quality thereof. Manually generating, such as by a human, data accurately annotating or labelling the training examples utilizes substantial resources, including human resources and computing resources, and is impracticable for generating a relatively large number, volume, or cardinality, of training examples, such as one hundred thousand training examples, or more. The automatically generated training dataset described herein includes automatically generated training examples, generated in the absence of manual, or human, generated annotation, or labelling, data. Although not expressly described herein, training examples differing from the training examples included in the automatically generated training dataset described herein, and including manual, or human, generated annotation, or labelling, data may be used in combination with the automatically generated training dataset described herein. Although described as a training dataset, multiple disjoint, or non-overlapping, portions, or subsets, of the automatically generated training dataset may be identified, which may include identifying a subset as training data and identifying another subset as validation data. An example of obtaining a training dataset is shown in FIG. 9.

A respective training example includes a training video, or an identifier thereof, a reference video, or an identifier thereof, and automatically generated annotation, or label, data indicating a similarity between the training video and the reference video, such as a fingerprint similarity. The training examples may include recall examples, precision examples, or both. The training dataset may include multiple training examples, such as thousands of training examples. For example, the training dataset may include six hundred thousand high-confidence training examples, four hundred thousand low-confidence training examples, and one hundred-fifty thousand precision examples.

The precision examples may be training examples associated with the precision of the trained machine learning video screening model, which may be expressed as the ratio of true positive screening data generated by the trained machine learning video screening model to a sum of the true positive screening data generated by the trained machine learning video screening model and false positive screening data generated by the trained machine learning video screening model. For example, a precision example may correspond with false positive screening data generated using another, different, machine learning video screening model, such as a machine learning video screening model trained prior to training the current machine learning video screening model.

The recall examples may be training examples associated with the recall, or sensitivity, of the trained machine learning video screening model, which may be expressed as the ratio of true positive screening data generated by the trained machine learning video screening model to the sum of true positive screening data generated by the trained machine learning video screening model and false negative screening data generated by the trained machine learning video screening model. The recall examples may include high-confidence training examples, low-confidence training examples, or both. For example, a high-confidence recall example may correspond with true positive screening data generated using another, different, machine learning video screening model, such as a machine learning video screening model trained prior to training the current machine learning video screening model. In another example, a low-confidence recall example may correspond with false negative screening data generated using another, different, machine learning video screening model, such as a machine learning video screening model trained prior to training the current machine learning video screening model. As used herein, the term "confidence," and variations and wordforms thereof, such as "high-confidence" and "low-confidence," refers to a value or values, such as a floating-point value in the range from zero (0) to one (1), automatically generated by a machine learning model and indicating a probability or likelihood, determined by the machine learning model, that a corresponding output, such as corresponding output data indicating a subframe portion of an input frame matched to a reference frame, is accurate.

An untrained machine learning video screening model is obtained at 820. The untrained machine learning video screening model may be a self-supervised object-detection model. In some implementations, the untrained machine learning video screening model may be a partially trained untrained machine learning video screening model. The machine learning video screening model may be a mathematical model for evaluating an input, or probe, video to detect similarities with one or more reference videos, such as based on fingerprint similarity. For example, obtaining the untrained machine learning video screening model may include reading, or otherwise accessing, data defining or describing the untrained machine learning video screening model, such as from a file, a database, or another data source.

In some implementations, the machine learning, or nonlinear, video screening model is an artificial neural network model. As used herein, the term "neural network" indicates an artificial neural network.

A neural network model includes layers that respectively include connected units (nodes, perceptrons, or neurons) followed by nonlinearities. As used herein, the term 'neuron' indicates an artificial neuron. A layer is a set of nodes, or neurons, in a neural network that process a set of input features, or the output of those neurons. The artificial neural network model describes the layers for organizing and arranging nodes, or neurons, in the artificial neural network, including an input layer, an output layer, and intermediate, internal, or hidden layers.

The artificial neural network model describes the nodes, or artificial neurons. A node, or neuron, in an artificial neural network may receive, or otherwise access, input values and may generate an output value. For example, a node, or neuron, may calculate the output value by applying an activation function (nonlinear transformation) to a weighted sum of input values. A node in an artificial neural network may be expressed as a mathematical function, which may include describing or defining one or more parameters or thresholds for the node. A node in an artificial neural network may receive one or more input signals, determine an internal state subsequent to, or in accordance with, receiving the input signals (activation), and output an output signal based on (such as using or responsive to) the input signals and the internal state. The input signals may be associated with respective weighting values. The artificial neural network model may describe or define the weighting values. For example, determining the internal state may include determining a weighted sum of the input signals, transforming the sum, such as using an activation or transform function, which may be a nonlinear function, and outputting the transformation result, or a function (output function) thereof.

The input layer, or first layer, may receive, or otherwise access, input data for the neural network (features). The nodes of the artificial neural network input layer (input nodes) may receive the artificial neural network input data. Input data for a layer other than the input layer may be output data from another, adjacent, layer of the neural network. Nodes in adjacent layers may be interconnected along edges. The artificial neural network model may describe or define weighting values associated with respective edges. A hidden layer may be a synthetic layer in a neural network between an input layer and an output layer. The hidden layers may include an activation function, such as for training. The output layer, or final layer, may output data indicating an answer or prediction of the neural network, such as responsive to the input data accessed by the input layer. The activation function may be a function that may use a weighted sum of inputs from a previous layer to generate data, which may be nonlinear, which may be output (output value), such as to a subsequent layer. The output nodes in the output layer of the artificial neural network may output prediction values based on (such as using or responsive to) the received input values.

Video screening using a machine learning video screening model trained using self-supervised training may include using a convolutional neural network (CNN) model. A convolutional neural network may be a neural network in which a layer is a convolutional layer. A convolutional neural network may include multiple convolutional layers. In some embodiments, a convolutional neural network may include one or more convolutional layers, one or more pooling layers, one or more dense, or fully connected, layers, or a combination thereof. A convolutional neural network may be a deep neural network, which may be a neural network including multiple hidden layers.

A convolutional layer may be a layer of the neural network that applies a convolutional filter to an input matrix, which may include performing one or more convolutional operations. A convolutional filter is a matrix having the rank (ordinality) of the input matrix, but a smaller shape (element dimensions). The respective elements, or cells, of a convolutional filter matrix may be single digit binary values, such as zero or one, which may be initialized, such as randomly, and trained to optimize. A convolutional operation may include element-wise multiplication of the convolutional filter and a portion, or slice, of the input matrix having the same rank and size as the convolutional filter. The convolutional operation may include a summation of the matrix resulting from the element-wise multiplication. The convolutional layer may perform a respective convolutional operation for the respective portions, or slices, of the input matrix.

A pooling layer may be a layer of the neural network that reduces a matrix, or matrices, output by a previous convolutional layer, to a smaller matrix. For example, a pooling layer may determine a maximum, or average, value for a pooled area (pooling operation). A pooling operation may divide the matrix (convolutional output) into respective portions, which may overlap, such as partially, wherein the difference in matrix position for respective adjacent portions may be referred to as a stride.

A dense, or fully connected layer, may be a layer of the neural network, such as a hidden layer, in which a respective node is connected to the nodes in a subsequent hidden layer. A convolutional neural network may be a multi-layer convolutional neural network having K×K weight matrices (kernels), which may include spatial processing, such as down-sampling, up-sampling, or modulation.

In some implementations, the machine learning video screening model is a Single Shot MultiBox Detector, which is a deep neural network, which may use depthwise separable convolutions, which improves the speed and efficiency relative to other models.

The untrained machine learning video screening model is trained using the training dataset at 830 to generate the trained machine learning video screening model. Training the machine learning video screening model includes inputting respective pairs (training pairs) of a training video and a reference video, into the machine learning video screening model, wherein the annotation data is unavailable to the machine learning video screening model being trained, to obtain output data indicating whether a similarity, such as fingerprint similarity, between the training video, or a spatial portion thereof, and the reference video is detected, comparing the output data with the annotation data for the respective pair, and updating one or more parameters of the machine learning video screening model based on the comparison such that the accuracy of the machine learning video screening model is improved, which may be performed, such as iteratively, such that the output of the trained machine learning video screening model matches the annotation data.

In some implementations, obtaining a trained machine learning video screening model trained using self-supervised training 800 may be performed automatically, such as in accordance with a defined temporal period, such as daily, or in response to a defined detected event, such as detecting a request to obtain a trained machine learning video screening model trained using self-supervised training.

Other implementations of obtaining a trained machine learning video screening model trained using self-supervised training 800 are available. In some implementations, additional elements of obtaining a trained machine learning video screening model trained using self-supervised training 800 can be added, certain elements can be combined, and/or certain elements can be removed.

FIG. 9 is a block diagram of an example of a method of obtaining an automatically generated training dataset 900. Obtaining the automatically generated training dataset 900, or a portion or portions thereof, is implemented by a computing device, such as the computing device 100 shown in FIG. 1, one or more of the computing and communication devices 100A, 100B, 100C shown in FIG. 2, a video hosting system, such as the video hosting system 400 shown in FIG. 4, or a component thereof, or a video similarity engine, such as the video similarity engine 500 shown in 5.

Obtaining the automatically generated training dataset 900 may be similar to obtaining a training dataset as shown at 810 in FIG. 8, except as is described herein or as is otherwise clear from context. For example, video screening using a machine learning video screening model trained using self-supervised training, such as the video screening using a machine learning video screening model trained using self-supervised training 700 shown in FIG. 7, may include obtaining a trained machine learning video screening model trained using self-supervised training, such as obtaining a trained machine learning video screening model trained using self-supervised training as shown at 710 in FIG. 7 or obtaining a trained machine learning video screening model trained using self-supervised training 800 as shown in FIG. 8, which may include obtaining a training dataset using self-supervised training, such as the obtaining a training dataset using self-supervised training as shown at 810 in FIG. 8 or obtaining the automatically generated training dataset 900 as shown in FIG. 9.

Obtaining the automatically generated training dataset 900 includes obtaining an unannotated training pair at 910, obtaining predicate screening data at 920, obtaining candidate screening data at 930, obtaining a candidate pair at 940, determining similarity at 950, determining confidence at 960, determining complexity at 970, including the pair in the training dataset at 980, and debiasing the training dataset at 990.

Although not expressly shown separately in FIG. 9, obtaining the automatically generated training dataset 900 may include obtaining, or identifying, a set, group, or other collection, of input, or probe, videos for use as training videos. The input, or probe, videos used as training videos may be videos uploaded, or otherwise made available, to the computing device or devices, or a system including the computing device or devices, implementing self-supervised training, or a portion thereof. For example, the set, group, or other collection, of input, or probe, videos identified for use as training videos may include thousands of videos, such as more than one hundred thousand videos. Although not expressly shown separately in FIG. 9, obtaining the automatically generated training dataset 900 may include obtaining, or identifying, the reference videos, such as by obtaining, or accessing, the repository of reference videos described herein.

An unannotated training pair, including a training video and a reference video, is obtained at 910. The training video is obtained from the set, group, or other collection, of input, or probe, videos identified for use as training videos. The reference video is obtained from the repository, or other collection, of videos defined as reference videos. Manually generated, such as human generated, annotation data, or training label data, such as per-frame annotation data, is unavailable for, or omitted or absent from, the unannotated training pair, as obtained at 910.

Figure 10:
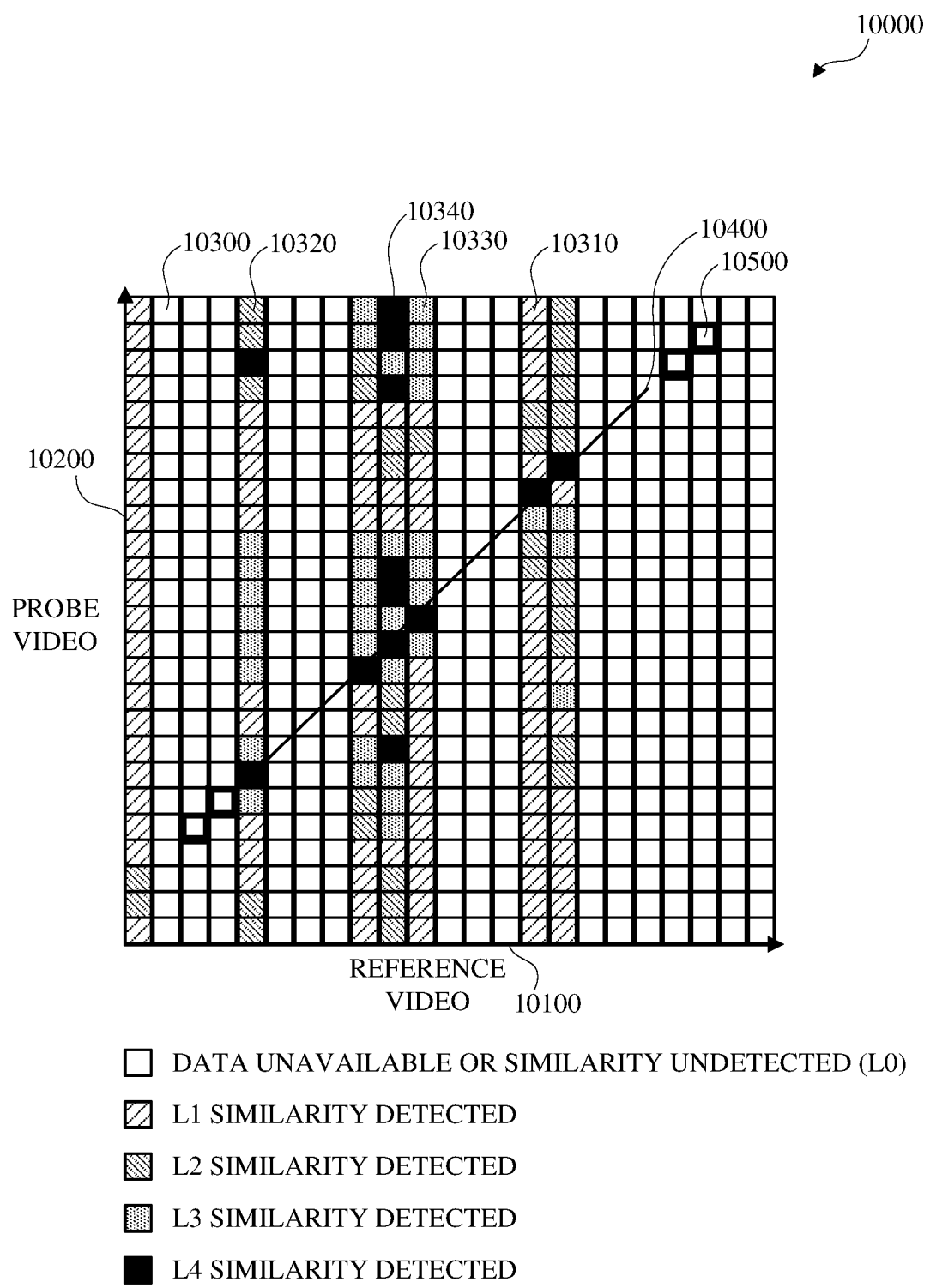
FIG. 10 is a diagram of an example of a graphical representation of predicate screening data with respect to a reference video and an input, or probe, video.

Predicate screening data is obtained at 920 for the unannotated training pair. The predicate screening data is data, such as log data, generated by, or in accordance with, automatically screening one or more of the input, or probe, videos, with respect to the reference videos, by a previously trained machine learning video screening model (predicate machine learning video screening model or predicate video screening model), trained prior to training the current machine learning video screening model. In some implementations, generating the predicate screening data may include using automatic video screening other than video screening using the predicate video screening model. An example graphical representation of predicate screening data is shown in FIG. 10.

Prior to training the current machine learning video screening model, such as during a defined temporal span, such as a day (twenty-four hours), preceding training the current machine learning video screening model, one or more of the input, or probe, videos are screened, with respect to the reference videos, by a the predicate video screening model using a defined, high-confidence, confidence threshold, such as 0.6, and corresponding screening data, output, or generated, by the predicate video screening model, is stored, such as in a screening data log, or otherwise made available for training the current machine learning video screening model. For training the current machine learning video screening model, the previously generated log data corresponding to the training videos is obtained as predicate screening data.

The predicate screening data includes screening data generated by the predicate video screening model with respect to similarities, such as fingerprint similarities, identified by the predicate video screening model, between spatial subframes from respective temporal sequences from respective input videos and corresponding frames from the respective reference videos.

A respective record, row, or entry in the predicate screening data includes an identifier of the input, or probe, video. The respective record, row, or entry in the predicate screening data includes an identifier of the reference video. The respective record, row, or entry in the predicate screening data includes a segment start position, such as a temporal, or sequential, location of a frame in the input, or probe, video. The respective record, row, or entry in the predicate screening data includes a segment end position, such as a temporal, or sequential, location of a frame in the input, or probe, video, subsequent, in the video, to the frame corresponding to the segment start position. The respective record, row, or entry in the predicate screening data includes a reference start position, such as a temporal, or sequential, location of a frame in the reference video. The respective record, row, or entry in the predicate screening data includes a reference end position, such as a temporal, or sequential, location of a frame in the reference video, subsequent, in the reference video, to the frame corresponding to the reference start position. The segment start position and the segment end position describe an interval or segment of the input, or probe, video (predicate temporal segment) identified by the predicate video screening model as being similar to a corresponding segment of the reference video (reference temporal segment), such as based on fingerprint similarity, identified with a confidence greater than or equal to a defined minimum, high-confidence, confidence threshold, wherein the reference start position and the reference end position describe the corresponding reference temporal segment of the reference video.

The respective record, row, or entry in the predicate screening data includes a center value indicating a spatial center of the subframes in the input video corresponding to the identified predicate temporal segment, which may be an aggregate, such as an average, of the respective per-frame subframe locations from the respective frames corresponding to the identified predicate temporal segment. The respective record, row, or entry in the predicate screening data includes an area, such as a per-frame area, for the subframes in the input video corresponding to the identified predicate temporal segment, which may be an aggregate, such as an average, of the respective per-frame subframe areas from the respective frames corresponding to the identified predicate temporal segment.

Multiple spatial, temporal, or both, portions of a respective input video may be indicated by respective records, rows, or entries in the predicate screening data. The predicate screening data may include respective records, rows, or entries indicating respective similarities between an input video, or a portion thereof, and respective reference videos, such as based on fingerprint similarity. Data corresponding to spatial, temporal, or both, portions of the input video unidentified by the predicate video screening model, or identified with a confidence below the minimum, high-confidence, confidence threshold, may be omitted from, or absent from, the predicate screening data. Per-frame data, such as for the frames, other than the first and last frame, in a segment indicated by the predicate screening data, may be omitted, or absent, from the predicate screening data. Confidence data and similarity data may be omitted, or absent, from the predicate screening data.

For the unannotated training pair identified at 910, obtaining the predicate screening data at 920 includes obtaining, such as reading, or otherwise accessing, respective rows, records, or entries from the predicate screening data that indicate that a similarity, such as a fingerprint similarity, between the training video and the reference video was identified by the predicate video screening model. The training video includes the predicate temporal segment indicated in the respective row, record, or entry, from the predicate screening data. The training video may include one or more frames, or images, prior to, in temporal or sequential order, the predicate temporal segment indicated in the respective row, record, or entry, from the predicate screening data. The training video may include one or more frames, or images, subsequent to, in temporal or sequential order, the predicate temporal segment indicated in the respective row, record, or entry, from the predicate screening data.

Candidate screening data is obtained at 930. Obtaining the candidate screening data includes identifying an extended temporal segment from the training video. The extended temporal segment includes the predicate temporal segment of the training video as identified based on the predicate screening data at 920. The extended temporal segment includes one or more frames from the training video other than frames corresponding to the predicate temporal segment, such as frames preceding the predicate temporal segment, frames subsequent to the predicate temporal segment, or both. The extended temporal segment may include one or more frames from a defined temporal range, such as two seconds, or a defined cardinality of frames, such as sixty frames, immediately prior to the predicate temporal segment, immediately subsequent to the predicate temporal segment, or both. For example, a sampling of frames, such as a uniform sampling of frames, such as a sampling of frames including a defined cardinality of frames, such as three frames, from the defined temporal range, or the defined cardinality of frames, immediately prior to the predicate temporal segment may be included in the extended temporal segment. In another example, a sampling of frames, such as a uniform sampling of frames, such as a sampling of frames including the defined cardinality of frames, such as three frames, from the defined temporal range, or the defined cardinality of frames, immediately subsequent to the predicate temporal segment may be included in the extended temporal segment. In another example, the extended temporal segment may include three frames from the two seconds of the current video immediately prior to the predicate temporal segment and three frames from the two seconds of the current video immediately subsequent to the predicate temporal segment.

Obtaining the candidate screening data includes obtaining a second previously trained video screening model. For example, the second previously trained video screening model may be similar to the predicate video screening model obtained at 920, except that the second previously trained video screening model may be used with a defined, low-confidence, confidence threshold, which is lower than the defined, high-confidence, confidence threshold used by the predicate video screening model. For example, the defined, high-confidence, confidence threshold may be 0.6, or sixty percent, and the defined, low-confidence, confidence threshold may be 0.4, or forty percent.

Obtaining the candidate screening data includes generating, on a per-frame basis, such as for the frames from the extended temporal segment, candidate screening data for the extended temporal segment with respect to the reference video identified at 910 using the second previously trained video screening model. The candidate screening data indicates an association, which may be based on similarity, such as based on fingerprint similarity, between a respective screening frame from the reference video and a spatial portion (candidate subframe) of a candidate frame from the extended temporal segment. The candidate subframe may be a rectangular spatial portion of the respective candidate frame from the extended temporal segment. For example, with reference to FIG. 6, the candidate frame from the extended temporal segment may be the video frame 600 shown in FIG. 6 and the candidate subframe may correspond with the spatial subframe 610 shown in FIG. 6. Obtaining the candidate screening data includes identifying candidate subframe pairs for the candidate subframes indicated in the candidate screening data. A respective candidate subframe pair includes the candidate subframe and the corresponding screening frame from the reference video identified from the candidate screening data.

A candidate subframe pair is obtained at 940. Obtaining the candidate subframe pair includes identifying a candidate subframe from the candidate screening data obtained at 930, extracting the candidate subframe from the corresponding frame from the extended temporal segment from the training video, and using the extracted candidate subframe as a frame to compare with the corresponding screening frame from the reference video. The candidate subframe pair includes the extracted candidate subframe as a frame and the corresponding screening frame from the reference video.

A similarity score or value is determined at 950 for the candidate subframe pair, such as based on fingerprint similarity. The similarity score for the candidate subframe pair indicates measurement of similarity between the extracted candidate subframe as a frame and the corresponding screening frame from the reference video, such as based on fingerprint similarity. In some implementations, determining the similarity score for the candidate subframe pair includes generating a fingerprint representing the extracted candidate subframe and comparing the fingerprint representing the extracted candidate subframe with a fingerprint for the corresponding screening frame from the reference video. The fingerprint for the corresponding screening frame from the reference video may be a previously generated fingerprint for the corresponding screening frame from the reference video. Determining the similarity at 950 may include determining whether the similarity score for the candidate subframe pair is greater than or equal to a defined minimum similarity threshold. Candidate subframe pairs identified as having a similarity score that is greater than or equal to the defined minimum similarity threshold may be identified as similar and candidate subframe pairs identified as having a similarity score that is less than the defined minimum similarity threshold (first defined similarity threshold) may be identified as non-similar. Obtaining the automatically generated training dataset 900 includes determining whether the similarity score for the candidate subframe pair is within, such as less than, or exceeds, such as greater than or equal to, the defined minimum similarity threshold.

In response to a determination that the similarity score for the candidate subframe pair is less than the defined minimum similarity threshold, the candidate subframe pair is omitted, or excluded, from the training dataset. For example, a candidate subframe pair identified as non-similar has a similarity value that may be zero, or greater than zero, and is less than the defined minimum similarity threshold, indicating insufficient similarity for use as a training example.

Obtaining the automatically generated training dataset 900 includes filtering the candidate subframe pairs to obtain low-confidence training examples at 960. In response to a determination that the similarity score for the candidate subframe pair is greater than or equal to the defined minimum similarity threshold, per-frame filtering screening data is obtained at 960 from the predicate video screening model, using the defined, high-confidence, confidence threshold, with respect to the training video and the reference video corresponding to the candidate subframe pair. Obtaining the automatically generated training dataset 900 includes determining whether data indicating an association between the candidate subframe and the screening frame indicated in the candidate subframe pair is included in the filtering screening data.

In response to a determination that data indicating the association between the candidate subframe and the screening frame, indicated in the candidate subframe pair, is included in the filtering screening data, indicating that the predicate video screening model using the defined, high-confidence, confidence threshold identified the candidate subframe pair as similar, the candidate subframe pair is omitted, or excluded, from the training dataset, or is included in the training dataset as a high-confidence training example.

In response to a determination that data indicating the association between the candidate subframe and the screening frame indicated in the candidate subframe pair is absent from, or omitted from, the filtering screening data, indicating that the predicate video screening model using the defined, high-confidence, confidence threshold identified the candidate subframe pair as non-matching or as matching with a confidence value below the defined, high-confidence, confidence threshold, the candidate subframe pair is included in the training dataset as a low-confidence training example.

Obtaining the automatically generated training dataset 900 includes complexity-based filtering of the candidate subframe pairs to omit, or exclude, low-complexity training examples at 970. The complexity-based filtering includes identifying a spatial portion of the screening frame from the reference video, such as a top one-quarter quadrant of the screening frame, generating fingerprint data for the spatial portion of the screening frame, and comparing the fingerprint data for the spatial portion of the screening frame with the fingerprint data for the screening frame to obtain a similarity value indicating a measure of similarity between the spatial portion of the screening frame and the screening frame, such as based on fingerprint similarity. A similarity value greater than a defined minimum similarity complexity threshold (second defined similarity threshold) indicates that the screening frame lacks sufficient complexity, or image detail, such as wherein the screening frame is substantially uniform in color, such as substantially uniformly black.

In response to a determination that the similarity value with respect to the screening frame and the spatial portion of the screening frame is greater than or equal to a defined minimum similarity complexity threshold (second defined similarity threshold), indicating that the screening frame lacks sufficient complexity, or image detail, the corresponding training pair is omitted, or excluded, from the training dataset.

In response to a determination that the similarity value with respect to the screening frame and the spatial portion of the screening frame is less than the defined minimum similarity complexity threshold (second defined similarity threshold), the corresponding training pair is included in the training dataset at 980. Other complexity metrics may be evaluated.

Although not shown separately in FIG. 9, obtaining the automatically generated training dataset 900 may be performed, such as iteratively, for the respective combinations of a training video from the set of input, or probe, videos and a reference video from the repository of reference videos.

In some implementations, obtaining a candidate pair at 940, determining similarity at 950, determining confidence at 960, determining complexity at 970, and including the pair in the training dataset at 980, may be performed with respect to two or more candidate subframe pairs, which may differ spatially, temporally, or both, as indicated by the broken directional line at 982.

In some implementations, obtaining an unannotated training pair at 910, obtaining predicate screening data at 920, obtaining candidate screening data at 930, obtaining a candidate pair at 940, determining similarity at 950, determining confidence at 960, determining complexity at 970, and including the pair in the training dataset at 980, may be performed with respect to two or more training pairs, as indicated by the broken directional line at 984.

The training dataset is debiased at 990. Debiasing the training dataset may improve the efficiency, accuracy, or both, of the trained video screening model by reducing, or eliminating, bias introduced by the automatic generation of the training dataset. Debiasing may detect bias with respect to the spatial, temporal, or both, location of candidate subframes. Debiasing may detect bias with respect to the spatial, temporal, or both, size of candidate subframes. Debiasing may detect bias with respect to the spatial orientation, such as landscape or portrait, of candidate subframes.

Other implementations of video screening using a machine learning video screening model trained using self-supervised training 900 are available. In some implementations, additional elements of video screening using a machine learning video screening model trained using self-supervised training can be added, certain elements can be combined, and/or certain elements can be removed.

FIG. 10 is a diagram of an example of a graphical representation of predicate screening data 10000 with respect to a reference video and an input, or probe, video. The example graphical representation of predicate screening data 10000 shows a horizontal axis 10100 corresponding to the reference video, wherein increasing temporal sequence is shown from left to right. The example graphical representation of predicate screening data 10000 shows a vertical axis 10200 corresponding to the probe video, wherein increasing temporal sequence is shown from bottom to top.

Squares are shown as a matrix of rows and columns with respect to the horizontal axis 10100, representing the reference video, and the vertical axis 10200, representing the probe video.

The columns of the matrix shown correspond with respective temporal locations, or frames, from the reference video. For example, the left most column shown corresponds with the temporally, or sequentially, first, or earliest, frame of the reference video.

The rows of the matrix shown correspond with respective temporal locations, or frames, from the probe video. For example, the lowest column shown corresponds with the temporally, or sequentially, first, or earliest, frame of the probe video.

The background of the respective squares indicates the determined similarity between the corresponding frame of the probe video and the corresponding frame of the reference video. For simplicity and clarity, five levels, L0, L1, L2, L3, L4, of similarity are shown in FIG. 10.

A respective pair of a frame of the probe video and a corresponding frame of the reference video for which data indicating a similarity (L0) is unavailable or otherwise indicates that a sufficient, such as greater than a defined threshold, similarity is undetected are shown with a white background, such as at 10300.

A respective pair of a frame of the probe video and a corresponding frame of the reference video for which data indicating a relatively low similarity (L1), greater than the defined threshold, is indicated in the predicate screening data, are shown with a wide diagonal down-left background, such as at 10310.

A respective pair of a frame of the probe video and a corresponding frame of the reference video for which data indicating a relatively moderately-low similarity (L2), greater than the defined threshold and greater than the relatively low similarity, is indicated in the predicate screening data, are shown with a narrow diagonal down-right background, such as at 10320.

A respective pair of a frame of the probe video and a corresponding frame of the reference video for which data indicating a relatively moderately-high similarity (L3), greater than the defined threshold and greater than the relatively moderately-low similarity, is indicated in the predicate screening data, are shown with a stippled background, such as at 10330.

A respective pair of a frame of the probe video and a corresponding frame of the reference video for which data indicating a relatively high similarity (L4), greater than the defined threshold and greater than the relatively moderately-high similarity, is indicated in the predicate screening data, are shown with a black background, such as at 10340.

A segment as identified in or by the predicate screening data is shown as a diagonal line 10400.

Respective pairs of a training frame from the probe video and a screen frame from the reference video that may be included in the extended temporal segment described with reference to obtaining candidate screening data as shown at 930 in FIG. 9, such as at 10500 in FIG. 10, are shown with a bold border.

Figure 11:
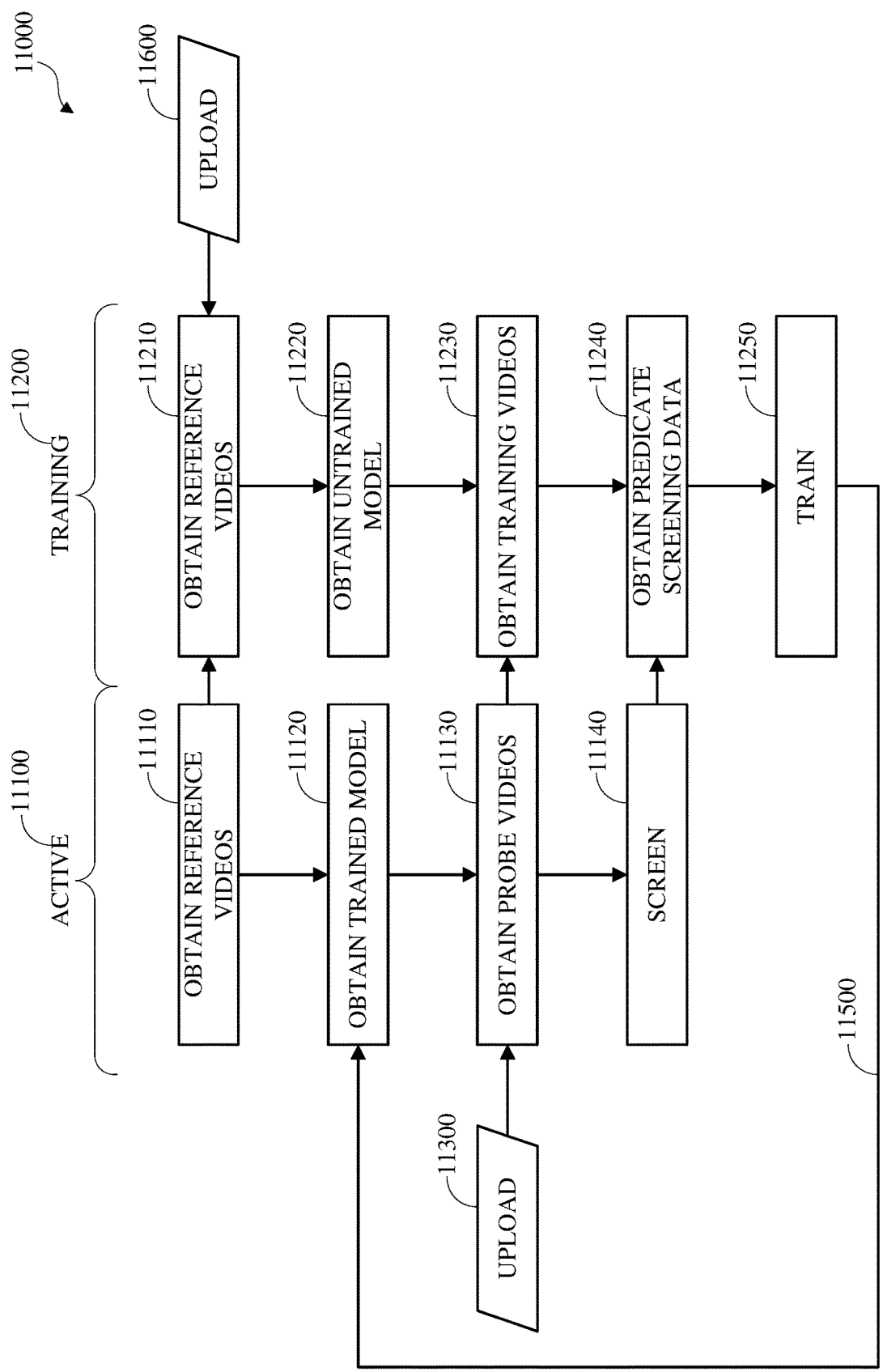
FIG. 11 is a block diagram of another example of a method of video screening using a machine learning video screening model trained using self-supervised training.

FIG. 11 is a block diagram of another example of a method of video screening using a machine learning video screening model trained using self-supervised training 11000. Video screening using a machine learning video screening model trained using self-supervised training 11000, or a portion or portions thereof, is implemented by a computing device, such as the computing device 100 shown in FIG. 1, one or more of the computing and communication devices 100A, 100B, 100C shown in FIG. 2, a video hosting system, such as the video hosting system 400 shown in FIG. 4, or a component thereof, or a video similarity engine, such as the video similarity engine 500 shown in 5.

Video screening using a machine learning video screening model trained using self-supervised training 11000 includes an active phase 11100 and a training phase 11200. The active phase 11100 and the training phase 11200 may be performed sequentially and iteratively, wherein a current iteration of the active phase 11100 may be performed prior to a subsequent iteration of the training phase 11200, and a current iteration of the training phase 11200 may be performed subsequent to a prior iteration of the active phase 11100.

The active phase 11100 may be similar to video screening using a machine learning video screening model trained using self-supervised training 700 as shown in FIG. 7, except as is described herein or as is otherwise clear from context. The active phase 11100 includes obtaining reference videos at 11110, obtaining a current trained machine learning video screening model trained using self-supervised training at 11120, obtaining probe videos at 11130, and generating screening data using the current trained machine learning video screening model at 11140. The active phase 11100 may be performed for a defined temporal span, such as one day (24 hours).

One or more reference videos are obtained at 11110. Obtaining the reference videos at 11110 includes obtaining, or otherwise accessing, a repository, database, data store, or other collection, of videos defined or described as reference videos. For example, a reference video, or protected video, may include content associated with copyright protection, or other content for which access restrictions are defined. The repository of reference videos may include, or may be otherwise associated with, previously generated fingerprint data for the respective reference videos. Although not expressly shown in FIG. 11, a reference video, or reference videos, may be obtained for which previously generated fingerprint data is unavailable, and video screening using a machine learning video screening model trained using self-supervised training 11000 may include automatically generating the corresponding fingerprint data.

A current trained machine learning video screening model trained using self-supervised training is obtained at 11120. The current trained machine learning video screening model is obtained from the output of a previous iteration of the training phase 11200 as shown by the directional line at 11500, wherein the reference videos obtained at 11110 are the reference videos used in the previous iteration of the training phase 11200. Obtaining the current trained machine learning video screening model trained using self-supervised training may be similar to obtaining a trained machine learning video screening model trained using self-supervised training as shown at 710 in FIG. 7, except as is described herein or as is otherwise clear from context. The current trained machine learning video screening model is implemented using a defined, high-confidence, confidence threshold.

One or more current probe, input, or unscreened, videos are obtained at 11130. For example, unscreened videos may be uploaded, as shown at 11300, or otherwise made available, to the computing device, or a system including the computing device, and the current video may be obtained from the unscreened videos. Obtaining the current probe, input, or unscreened, videos at 11120 may be similar to obtaining a current video as shown at 720 in FIG. 7, except as is described herein or as is otherwise clear from context. The current probe, input, or unscreened, videos are videos obtained, or otherwise made available, in accordance with the defiled temporal span for the current iteration of the active phase 11100. In some implementations, other videos, such as other unscreened videos may be used.

Screening data is generated at 11140 using the reference videos obtained at 11110, the current trained machine learning video screening model obtained at 11120, and the current probe videos obtained at 11130. Generating the screening data at 11140 includes generating, or populating, a screening data log, including the screening data, or a portion thereof, and storing, or otherwise outputting, the screening data log. Generating the screening data at 11140 may be similar to obtaining screening data from the trained machine learning video screening model trained using self-supervised training as shown at 730 in FIG. 7, except as is described herein or as is otherwise clear from context. For example, the screening data stored in the screening data log may be used as predicate screening data for a subsequent iteration of the training phase 11200. An example graphical representation of screening data log is shown in FIG. 10.

The screening data indicates similarities, identified by the current trained machine learning video screening model obtained at 11120, between spatial subframes from respective temporal sequences from respective current probe, input, or unscreened, videos obtained at 111130 and corresponding frames from the respective reference videos obtained at 11110.

A respective record, row, or entry in the screening data includes an identifier of a current probe, input, or unscreened, video. The respective record, row, or entry in the screening data includes an identifier of the reference video. The respective record, row, or entry in the screening data includes a segment start position, such as a temporal, or sequential, location of a frame in the current probe, input, or unscreened, video. The respective record, row, or entry in the screening data includes a segment end position, such as a temporal, or sequential, location of a frame in the current probe, input, or unscreened, video, subsequent, in the current probe, input, or unscreened, video, to the frame corresponding to the segment start position. The respective record, row, or entry in the screening data includes a reference start position, such as a temporal, or sequential, location of a frame in the reference video. The respective record, row, or entry in the screening data includes a reference end position, such as a temporal, or sequential, location of a frame in the reference video, subsequent, in the reference video, to the frame corresponding to the reference start position. The segment start position and the segment end position describe an interval or segment of the current probe, input, or unscreened, video (current temporal segment) identified by the current trained machine learning video screening model as being similar to a corresponding segment of the reference video (reference temporal segment), identified with a confidence greater than or equal to the defined minimum, high-confidence, confidence threshold, wherein the reference start position and the reference end position describe the corresponding reference temporal segment of the reference video.

The respective record, row, or entry in the screening data includes a center value indicating a spatial center of the subframes in the current probe, input, or unscreened, video corresponding to the identified current temporal segment, which may be an aggregate, such as an average, of the respective per-frame subframe locations from the respective frames corresponding to the identified current temporal segment. The respective record, row, or entry in the screening data includes an area, such as a per-frame area, for the subframes in the current probe, input, or unscreened, video corresponding to the identified current temporal segment, which may be an aggregate, such as an average, of the respective per-frame subframe areas from the respective frames corresponding to the identified current temporal segment.

Multiple similarities, such as fingerprint similarities, may be identified for a respective current probe, input, or unscreened, video and a corresponding reference video, which may be represented as multiple rows, records, or entries in the screening data log. Respective similarities between a respective current probe, input, or unscreened, video, and multiple reference videos may be identified.

The training phase 11200 may be similar to obtaining a trained machine learning video screening model trained using self-supervised training 800 as shown in FIG. 8, except as is described herein or as is otherwise clear from context. The training phase 11200 includes obtaining reference videos at 11210, obtaining a current untrained machine learning video screening model at 11220, obtaining training videos at 11230, obtaining predicate screening data at 11240, and training the current untrained machine learning video screening model at 11250.

One or more reference videos are obtained at 11210. Obtaining the reference videos at 11210 may be similar to obtaining the reference videos at 11110, except as is described herein or as is otherwise clear from context. Obtaining the reference videos at 11210 includes obtaining the reference videos obtained at 11110 as indicated by the directional line between obtaining the reference videos at 11110 and obtaining the reference videos at 11210. Although not shown expressly in FIG. 11, one or more of the reference videos obtained at 11110 may be absent, or omitted, from the reference videos obtained at 11210. Obtaining the reference videos at 11210 may include obtaining reference videos other than the reference videos obtained at 11110. For example, one or more reference videos other than the reference videos obtained at 11110 may be uploaded to, or otherwise included in, the repository, database, data store, or other collection, of videos defined or described as reference videos as shown at 11600, which may include automatically generating the fingerprint data for the respective reference videos.

A current untrained machine learning video screening model is obtained at 11220. Obtaining the current untrained machine learning video screening model may include obtaining data describing the current untrained machine learning video screening model, such as data describing or defining the structure or architecture of the current untrained machine learning video screening model, data describing or identifying a device or component, such as a hardware component, for training the current untrained machine learning video screening model, data defining or describing one or more untrained model-weights for the current untrained machine learning video screening model, which may be random or pseudo-random values, data defining or describing one or more training hyper-parameters for training the current untrained machine learning video screening model, which may be manually generated values. For example, the current untrained machine learning video screening model may be an artificial neural network model and the data describing or defining the current untrained machine learning video screening model may indicate a number, or cardinality, of layers, a number, or cardinality, of nodes, or artificial neurons, or both for the current untrained machine learning video screening model.

Training videos are obtained at 11230. The training videos obtained at 11230 include the probe videos obtained at 11130, or a portion thereof, subsequent to the screening at 11140, as indicated by the directional line between obtaining the probe videos at 11130 and obtaining the training videos at 11230. Obtaining the training videos at 11230 may be similar to obtaining a training dataset as shown at 810 in FIG. 8, except as is described herein or as is otherwise clear from context.

Predicate screening data is obtained at 11240. Obtaining the predicate screening data at 11240 includes obtaining the screening data, or a portion thereof, output by the previous trained machine learning video screening model at 11140 as indicated by the directional line between generating screening data using the current trained machine learning video screening model at 11140 and obtaining predicate screening data at 11240.

The current untrained machine learning video screening model is trained at 11250 to obtain a current trained machine learning video screening model. Training the current untrained machine learning video screening model is similar to training the untrained machine learning video screening model using the training dataset as shown at 830 in FIG. 8, except as is described herein or as is otherwise clear from context. The current trained machine learning video screening model output by, or generated by, training the current untrained machine learning video screening model at 11250 may be used as the current trained machine learning video screening model for a subsequent iteration of the active phase 11100, as indicated by the directional line at 11500.

As used herein, the terms "optimal", "optimized", "optimization", or other forms thereof, are relative to a respective context and are not indicative of absolute theoretic optimization unless expressly specified herein.

As used herein, the term "set" indicates a distinguishable collection or grouping of zero or more distinct elements or members that may be represented as a one-dimensional array or vector, except as expressly described herein or otherwise clear from context.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in some implementations, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method of video content screening using a video screening model trained using self-supervised training, the method comprising:
   screening a current video in response to automatically identified screening data obtained from a trained video screening model trained using self-supervised training, wherein the screening data indicates a similarity between the current video and a reference video, and wherein the self-supervised training includes:
      obtaining the trained video screening model by training an untrained video screening model using a training dataset automatically generated by:
         obtaining automatically generated predicate screening data indicating a predicate temporal segment within a training video and a corresponding reference temporal segment within the reference video;
         obtaining candidate screening data for an extended temporal segment from the training video, wherein the extended temporal segment includes the predicate temporal segment and at least one frame from the training video adjacent to the predicate temporal segment, wherein the candidate screening data indicates a similarity between a screening frame from the reference video and a candidate subframe, wherein the candidate subframe is a spatial portion of a candidate frame from the extended temporal segment; and
         in response to a determination that a determined similarity between the candidate subframe and the screening frame is greater than or equal to a defined similarity threshold, including, in the automatically generated training dataset, training example data indicating the similarity between the candidate subframe and the screening frame.

2. The method of claim 1, wherein the self-supervised training includes:
   obtaining the training video from a plurality of training videos corresponding to the automatically generated predicate screening data;
   obtaining the reference video from a plurality of reference videos; and
   obtaining the predicate screening data, wherein the predicate screening data is previously generated by screening the plurality of training videos with respect to the plurality of reference videos using a previously trained video screening model using a first defined confidence threshold.

3. The method of claim 2, wherein the automatically identified screening data is obtained from the trained video screening model trained using self-supervised training using the first defined confidence threshold.

4. The method of claim 2, wherein including the training example data in the automatically generated training dataset includes:
   obtaining filtering screening data by screening the training video with respect to the reference video using the previously trained video screening model using the first defined confidence threshold;
   including the training example data in the automatically generated training dataset in response to a determination that data indicating the similarity between the candidate subframe and the screening frame is absent from the filtering screening data; and omitting the training example data from the automatically generated training dataset in response to a determination that data indicating the similarity between the candidate subframe and the screening frame is included in the filtering screening data.

5. The method of claim 2, wherein obtaining the candidate screening data includes obtaining the candidate screening data from the previously trained video screening model using a second defined confidence threshold that is lower than the first defined confidence threshold.

6. The method of claim 1, wherein including the training example data in the automatically generated training dataset includes:
　obtaining a portion of the screening frame;
　obtaining a fingerprint for the portion of the screening frame;
　obtaining a fingerprint for the screening frame;
　determining a similarity value indicating a measure of similarity between the fingerprint for the portion of the screening frame and the fingerprint for the screening frame;
　including the training example data in the automatically generated training dataset in response to a determination that the similarity value is less than a defined maximum similarity threshold; and
　omitting the training example data from the automatically generated training dataset in response to a determination that the similarity value is greater than or equal to the defined maximum similarity threshold.

7. The method of claim 1, wherein including the training example data in the automatically generated training dataset includes:
　omitting the training example data from the automatically generated training dataset in response to a determination that a size of the candidate subframe is less than a defined minimum size.

8. The method of claim 1, wherein the self-supervised training includes debiasing the automatically generated training dataset.

9. A method of video content screening using a video screening model trained using self-supervised training, the method comprising:
　obtaining an input video;
　obtaining, from a trained video screening model trained using self-supervised training, screening data indicating an automatically identified association between the input video and a reference video, wherein the self-supervised training includes:
　　obtaining an automatically generated training dataset, wherein obtaining the automatically generated training dataset includes:
　　　obtaining a training video;
　　　obtaining the reference video;
　　　obtaining predicate screening data generated using a first previously trained video screening model with respect to the training video and the reference video, wherein the predicate screening data indicates a predicate temporal segment within the training video and a corresponding reference temporal segment within the reference video;
　　　obtaining, from a second previously trained video screening model, candidate screening data for an extended temporal segment from the training video, wherein the extended temporal segment includes the predicate temporal segment and at least one of a frame from the training video preceding the predicate temporal segment or a frame from the training video subsequent to the predicate temporal segment, wherein the candidate screening data indicates an association between a screening frame from the reference video and a candidate subframe, wherein the candidate subframe is a spatial portion of a candidate frame from the extended temporal segment; and
　　　in response to a determination that:
　　　　a determined similarity value with respect to the candidate subframe and the screening frame is greater than or equal to a first defined similarity threshold,
　　　　data indicating the association between the candidate subframe and the screening frame is absent from filtering screening data obtained from the first previously trained video screening model with respect to the training video and the reference video, and
　　　　a determination that a similarity value with respect to the screening frame and a spatial portion of the screening frame is less than a second defined similarity threshold,
　　　including, in the automatically generated training dataset, training example data indicating the association between the candidate subframe and the screening frame;
　　debiasing the automatically generated training dataset;
　　obtaining an untrained video screening model; and
　　obtaining the trained video screening model by training the untrained video screening model using the automatically generated training dataset; and
　in response to obtaining the screening data, identifying the input video as a screened video.

10. The method of claim 9, wherein:
the input video is one of a plurality of input videos;
the reference video is one of a plurality of reference videos; and
obtaining the screening data includes obtaining screening data for the plurality of input videos with respect to the plurality of reference videos.

11. The method of claim 9, wherein:
the similarity between the input video and the reference video is a similarity between an automatically generated fingerprint for the input video and an automatically generated fingerprint for the reference video; and
the similarity between the screening frame and the candidate subframe is a similarity between an automatically generated fingerprint for the screening frame and an automatically generated fingerprint for the candidate subframe.

12. The method of claim 9, wherein:
the predicate screening data is generated using the first previously trained video screening model with a first defined confidence threshold; and
obtaining the candidate screening data from the second previously trained video screening model includes obtaining the candidate screening data from the first previously trained video screening model with a second defined confidence threshold, wherein the first defined confidence threshold is greater than the second defined confidence threshold.

13. The method of claim 9, wherein identifying the input video as a screened video includes generating fingerprint data for a portion of the input video indicated by the screening data.

14. A system for training a video screening model using self-supervised training, the system comprising:
a non-transitory memory storing instructions; and
a processor that executes the instructions to:
obtain a trained video screening model, wherein, to obtain the trained video screen model, the processor executes the instructions to train an untrained video screening model using a training dataset, wherein, to automatically generate the training dataset the processor executes the instructions to:
obtain automatically generated predicate screening data indicating a predicate temporal segment within a training video and a corresponding reference temporal segment within the reference video;
obtain candidate screening data for an extended temporal segment from the training video, wherein the extended temporal segment includes the predicate temporal segment and at least one frame from the training video adjacent to the predicate temporal segment, wherein the candidate screening data indicates a similarity between a screening frame from the reference video and a candidate subframe, wherein the candidate subframe is a spatial portion of a candidate frame from the extended temporal segment; and
in response to a determination that a determined similarity between the candidate subframe and the screening frame is greater than or equal to a defined similarity threshold, include, in the automatically generated training dataset, training example data indicating the similarity between the candidate subframe and the screening frame.

15. The system of claim 14, wherein, to automatically generate the training dataset, the processor executes the instructions to:
obtain the training video from a plurality of training videos corresponding to the automatically generated predicate screening data;
obtain the reference video from a plurality of reference videos; and
obtain the predicate screening data, wherein the predicate screening data is previously generated by screening the plurality of training videos with respect to the plurality of reference videos using a previously trained video screening model using a first defined confidence threshold.

16. The system of claim 15, further comprising:
screening a current video in response to automatically identified screening data obtained from the trained video screening model, wherein the screening data indicates a similarity between the current video and a reference video, and wherein the screening data is obtained from the trained video screening model using the first defined confidence threshold.

17. The system of claim 16, wherein screening the current video includes:
identifying the current video as a screened video;
generating fingerprint data for a portion of the current video indicated by the screening data; and
comparing the fingerprint data for the portion of the current video with fingerprint data for the reference videos to determine whether the portion of the current video is similar to a respective portion of a respective reference video from the reference videos.

18. The system of claim 15, wherein, to include the training example data in the automatically generated training dataset, the processor executes the instructions to:
obtain filtering screening data by screening the training video with respect to the reference video using the previously trained video screening model using the first defined confidence threshold;
include the training example data in the automatically generated training dataset in response to a determination that data indicating the similarity between the candidate subframe and the screening frame is absent from the filtering screening data; and
omit the training example data from the automatically generated training dataset in response to a determination that data indicating the similarity between the candidate subframe and the screening frame is included in the filtering screening data.

19. The system of claim 15, wherein, to obtain the candidate screening data, the processor executes the instructions to obtain the candidate screening data from the previously trained video screening model using a second defined confidence threshold that is lower than the first defined confidence threshold.

20. The system of claim 14, wherein, to include the training example data in the automatically generated training dataset, the processor executes the instructions to:
obtain a portion of the screening frame;
obtain a fingerprint for the portion of the screening frame;
obtain a fingerprint for the screening frame;
determine a similarity value indicating a measure of similarity between the fingerprint for the portion of the screening frame and the fingerprint for the screening frame;
include the training example data in the automatically generated training dataset in response to a determination that the similarity value is less than a defined maximum similarity threshold; and
omit the training example data from the automatically generated training dataset in response to a determination that the similarity value is greater than or equal to the defined maximum similarity threshold.

* * * * *